(12) United States Patent
Bogatin et al.

(10) Patent No.: US 7,092,988 B1
(45) Date of Patent: Aug. 15, 2006

(54) RAPID COOKING OVEN WITH BROADBAND COMMUNICATION CAPABILITY TO INCREASE EASE OF USE

(76) Inventors: Jeffrey Bogatin, 888 Park Ave. #613, New York, NY (US) 10021; Richard Caron, 114 Garden St., Needham, MA (US) 02492; David McFadden, 9 Pine Knoll Rd., Lexington, MA (US) 02420; Bryan Connell, 605 Winged Foot, Garland, TX (US) 75044; Carl Pryor, 7406 Largewood Cir., Rowlett, TX (US) 75089; James K. Pool, III, 2615 Tulip, Richardson, TX (US) 75082

( * ) Notice: Subject to any disclaimer, the term of this patent is extended or adjusted under 35 U.S.C. 154(b) by 667 days.

(21) Appl. No.: 09/846,116

(22) Filed: Apr. 30, 2001

Related U.S. Application Data

(63) Continuation-in-part of application No. 09/815,222, filed on Mar. 22, 2001, and a continuation-in-part of application No. 09/199,902, filed on Nov. 25, 1998, now Pat. No. 6,060,701, and a continuation-in-part of application No. 09/169,523, filed on Oct. 9, 1998, now Pat. No. 6,008,483, and a continuation-in-part of application No. 09/064,988, filed on Apr. 23, 1998, now Pat. No. 6,140,626, and a continuation-in-part of application No. 09/053,960, filed on Apr. 2, 1998, now Pat. No. 5,990,466, which is a continuation-in-part of application No. 08/863,671, filed on May 27, 1997, now Pat. No. 5,927,265.

(60) Provisional application No. 60/200,277, filed on Apr. 28, 2000, provisional application No. 60/200,269, filed on Apr. 28, 2000, provisional application No. 60/200,270, filed on Apr. 28, 2000, provisional application No. 60/200,279, filed on Apr. 28, 2000, provisional application No. 60/200,281, filed on Apr. 28, 2000, provisional application No. 60/200,280, filed on Apr. 28, 2000, provisional application No. 60/200,283, filed on Apr. 28, 2000, provisional application No. 60/200,282, filed on Apr. 28, 2000, provisional application No. 60/200,266, filed on Apr. 28, 2000, provisional application No. 60/200,264, filed on Apr. 28, 2000, provisional application No. 60/200,268, filed on Apr. 28, 2000, provisional application No. 60/200,278, filed on Apr. 28, 2000, provisional application No. 60/200,267, filed on Apr. 28, 2000, provisional application No. 60/200,276, filed on Apr. 28, 2000, provisional application No. 60/200,265, filed on Apr. 28, 2000, provisional application No. 60/200,275, filed on Apr. 28, 2000, provisional application No. 60/191,343, filed on Mar. 22, 2000.

(51) Int. Cl.
    *G06F 15/16* (2006.01)
(52) U.S. Cl. ............. 709/203; 709/208; 709/226; 709/229; 219/702; 235/375; 700/211; 700/83
(58) Field of Classification Search ........ 709/223–229, 709/203, 208; 700/83, 90, 211; 219/702, 219/391, 393; 235/375–377
    See application file for complete search history.

(56) References Cited

U.S. PATENT DOCUMENTS

| | | |
|---|---|---|
| 2,495,429 A | 1/1950 | Spencer |
| 2,575,426 A | 11/1951 | Parnell |
| 2,593,067 A | 4/1952 | Spencer |
| 2,605,383 A | 7/1952 | Spencer |
| 2,658,742 A | 11/1953 | Suter et al. |
| 2,704,802 A | 3/1955 | Blass et al. |
| 2,795,054 A | 6/1957 | Bowen et al. |
| 2,827,537 A | 3/1958 | Haagensen |
| 2,885,294 A | 5/1959 | Larson et al. |
| 3,074,179 A | 1/1963 | Stelling |
| 3,104,303 A | 9/1963 | Crapuchettes |
| 3,104,305 A | 9/1963 | Crapuchettes |
| 3,235,971 A | 2/1966 | Tooby |
| 3,266,559 A | 8/1966 | Osborne |
| 3,364,912 A | 1/1968 | Dills et al. |
| 3,514,576 A | 5/1970 | Hilton et al. |
| 3,527,915 A | 9/1970 | Haagensen et al. |
| 3,532,847 A | 10/1970 | Püschner |
| 3,556,817 A | 1/1971 | Jeppson |

| | | | | | | |
|---|---|---|---|---|---|---|
| 3,557,334 A | 1/1971 | Lewis et al. | | 5,451,751 A | 9/1995 | Takimoto et al. |
| 3,578,463 A | 5/1971 | Smith et al. | | 5,525,782 A | 6/1996 | Yoneno et al. |
| 3,619,536 A | 11/1971 | Boehm et al. | | 5,558,793 A | 9/1996 | McKee et al. |
| 3,673,370 A | 6/1972 | Johnson | | 5,567,339 A | 10/1996 | Joo et al. |
| 3,676,809 A | 7/1972 | Paine et al. | | 5,676,044 A | 10/1997 | Lara, Jr. |
| 3,692,968 A | 9/1972 | Yasuoka | | 5,742,033 A | 4/1998 | Park |
| 3,715,551 A | 2/1973 | Peterson | | 5,909,183 A * | 6/1999 | Borgstahl et al. ...... 340/825.22 |
| 3,785,778 A | 1/1974 | Burstein et al. | | 5,927,265 A | 7/1999 | McKee et al. |
| 3,789,179 A | 1/1974 | Haagensen | | 5,990,466 A | 11/1999 | McKee et al. |
| 3,806,689 A | 4/1974 | Kegereis et al. | | 6,008,483 A | 12/1999 | McKee et al. |
| 3,810,248 A | 5/1974 | Risman et al. | | 6,060,701 A | 5/2000 | McKee et al. |
| 3,821,454 A | 6/1974 | Lobel | | 6,080,972 A * | 6/2000 | May ........................... 219/494 |
| 3,828,760 A | 8/1974 | Farber et al. | | 6,083,270 A * | 7/2000 | Scott ........................... 703/24 |
| 3,851,133 A | 11/1974 | Dygve et al. | | 6,121,593 A * | 9/2000 | Mansbery et al. .......... 219/679 |
| 3,872,603 A | 3/1975 | Williams et al. | | 6,137,095 A * | 10/2000 | Kashimoto et al. ......... 219/702 |
| 3,883,671 A | 5/1975 | Shatila | | 6,140,626 A | 10/2000 | McKee et al. |
| 3,884,213 A | 5/1975 | Smith | | 6,175,860 B1 * | 1/2001 | Gaucher ..................... 709/208 |
| 3,889,009 A | 6/1975 | Lipoma | | 6,232,584 B1 * | 5/2001 | Meyer ........................ 219/393 |
| 4,004,122 A | 1/1977 | Hallier | | 6,242,504 B1 | 6/2001 | Meyer-Roscher et al. |
| 4,019,009 A | 4/1977 | Kusunoki et al. | | 6,256,378 B1 * | 7/2001 | Iggulden et al. ........ 379/102.03 |
| 4,113,439 A | 9/1978 | Ookubo et al. | | 6,420,687 B1 * | 7/2002 | Ozawa et al. ................ 219/702 |
| 4,138,220 A | 2/1979 | Davies et al. | | 6,480,753 B1 | 11/2002 | Calder et al. .................. 700/83 |
| 4,154,861 A | 5/1979 | Smith | | 6,491,217 B1 * | 12/2002 | Catan ......................... 235/375 |
| 4,178,494 A | 12/1979 | Bottalico et al. | | 6,502,411 B1 * | 1/2003 | Okamoto ..................... 62/129 |
| 4,233,495 A | 11/1980 | Scoville et al. | | 6,546,419 B1 | 4/2003 | Humpleman et al. |
| 4,289,792 A | 9/1981 | Smith | | 6,549,818 B1 * | 4/2003 | Ali ............................... 700/90 |
| 4,311,895 A | 1/1982 | Tanabe | | 6,550,681 B1 * | 4/2003 | Ross et al. ............. 235/462.13 |
| 4,316,069 A | 2/1982 | Fitzmayer | | 6,557,756 B1 * | 5/2003 | Smith .......................... 235/379 |
| 4,336,434 A | 6/1982 | Miller | | 6,559,882 B1 * | 5/2003 | Kerchner ...................... 348/61 |
| 4,337,384 A | 6/1982 | Tanaka et al. | | 6,615,088 B1 | 9/2003 | Myer et al. |
| 4,354,083 A | 10/1982 | Staats | | 6,653,609 B1 * | 11/2003 | Ozawa et al. ................ 219/702 |
| 4,377,109 A | 3/1983 | Brown et al. | | 6,744,771 B1 | 6/2004 | Barber et al. |
| 4,384,191 A | 5/1983 | Guibert | | 6,758,397 B1 * | 7/2004 | Catan ......................... 235/375 |
| 4,396,817 A | 8/1983 | Eck et al. | | | | |
| 4,405,850 A | 9/1983 | Edgar | | | | |
| 4,409,453 A | 10/1983 | Smith | | FOREIGN PATENT DOCUMENTS | | |
| 4,419,374 A | 12/1983 | Pei | | DE | 2640684 | 3/1977 |
| 4,437,451 A | 3/1984 | Wysong | | GB | 1407852 | 9/1975 |
| 4,439,459 A | 3/1984 | Swartley | | JP | 56-44536 | 4/1981 |
| 4,460,332 A | 7/1984 | Lawler et al. | | | | |
| 4,471,000 A | 9/1984 | Brown et al. | | | | |
| 4,492,569 A | 1/1985 | Vestergaard | | | | |
| 4,494,525 A | 1/1985 | Alberton | | | | |
| 4,533,809 A | 8/1985 | Eke | | | | |
| 4,568,810 A | 2/1986 | Carmean | | | | |
| 4,587,393 A | 5/1986 | Ueda | | | | |
| 4,647,746 A | 3/1987 | Eke | | | | |
| 4,648,378 A | 3/1987 | Nishikawa | | | | |
| 4,687,895 A | 8/1987 | Chitre et al. | | | | |
| 4,778,970 A | 10/1988 | Klaila | | | | |
| 4,794,219 A | 12/1988 | Eke | | | | |
| 4,835,351 A | 5/1989 | Smith et al. | | | | |
| 4,839,494 A | 6/1989 | Vulpe | | | | |
| 4,839,502 A | 6/1989 | Swanson et al. | | | | |
| 4,841,125 A | 6/1989 | Edamura | | | | |
| 4,951,645 A | 8/1990 | Luebke et al. | | | | |
| 4,952,763 A | 8/1990 | Fritz | | | | |
| 4,960,100 A | 10/1990 | Pellicane | | | | |
| 4,999,471 A | 3/1991 | Guarneri et al. | | | | |
| 5,025,775 A | 6/1991 | Crisp | | | | |
| 5,089,679 A | 2/1992 | Eke | | | | |
| 5,128,158 A | 7/1992 | Chartrain | | | | |
| 5,134,263 A | 7/1992 | Smith et al. | | | | |
| 5,147,994 A | 9/1992 | Smith et al. | | | | |
| 5,166,487 A | 11/1992 | Hurley et al. | | | | |
| 5,182,426 A | 1/1993 | Sklenaik et al. | | | | |
| 5,221,817 A | 6/1993 | Ota | | | | |
| 5,254,823 A | 10/1993 | McKee et al. | | | | |
| 5,329,086 A | 7/1994 | DeMatteis et al. | | | | |
| 5,352,874 A | 10/1994 | Gong | | | | |
| 5,426,280 A * | 6/1995 | Smith ........................... 219/506 | | | | |
| 5,434,390 A | 7/1995 | MdKee et al. | | | | |
| 5,449,888 A | 9/1995 | Smith et al. | | | | |

* cited by examiner

Primary Examiner—Bharat Barot

(57) ABSTRACT

An improved oven for use in a residence is described. The oven includes a cooking chamber, a programmable controller for executing program instructions, memory media for recording executable program instructions, and at least one controllable cooking system under control of the programmable controller, which provides a data-processing-controlled high speed cooking process which may be applied to food placed in the oven chamber. A plurality of cooking programs are recorded in the memory media of the oven. These define a plurality of high speed cooking routines available for use with the oven. A gateway server is communicatively coupled to the programmable controller. It manages the communication of digital content which is at least in-part related to operation and utilization of the improved oven. A broadband communication channel extends from a source of digital content, which is external to the residence, to the residence. The broadband communication channel delivers particular digital content related to the oven through the gateway server for distribution within the residence, including distribution to the programmable controller of the oven in order to facilitate cooking operations utilizing the oven.

14 Claims, 14 Drawing Sheets

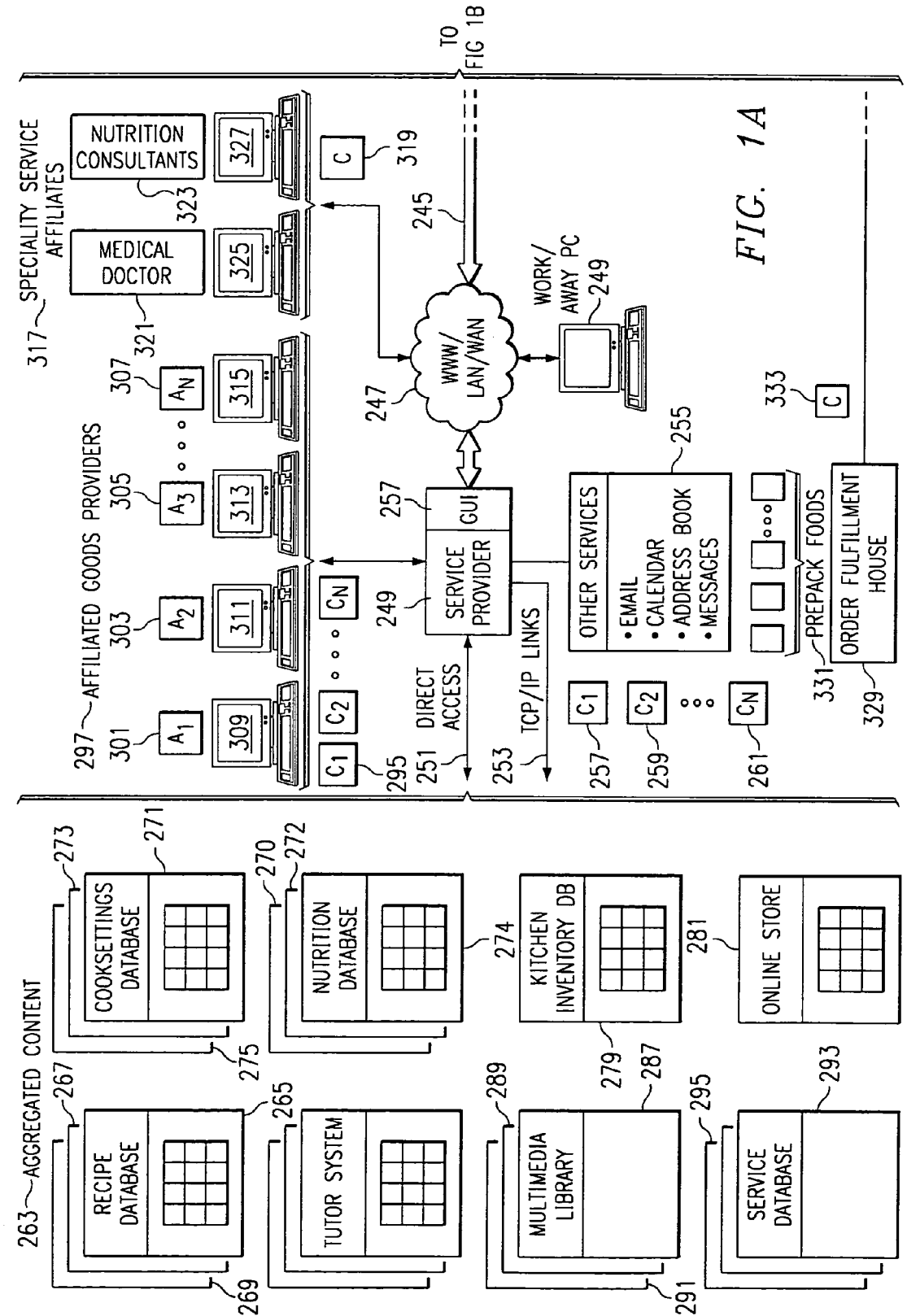

RAPID COOKING OVEN WITH BROADBAND COMMUNICATION CAPABILITY TO INCREASE EASE OF USE

PROVISIONAL PRIORITY CLAIM

This application claims the benefit of the following U.S. Provisional Patent Applications:

(1) Ser. No. 60/200,277, filed 28 Apr. 2000, entitled "Rapid Cooking Oven with Broadband Communication Capability to Increase Ease of Use";

(2) Ser. No. 60/200,269, filed 28 Apr. 2000, entitled "Method of Utilizing a Broadband Communication Channel for Cooking";

(3) Ser. No. 60/200,270, filed 28 Apr. 28, 2000, entitled "Rapid Cooking Oven with an Integrated Wireless User Appliance to Allow Access to Digital Content";

(4) Ser. No. 60/200,279, filed 28 Apr. 2000, entitled "Method of Cooking Utilizing a Combination Rapid Cooking Oven and Integrated Wireless User Appliance";

(5) Ser. No. 60/200,281, filed 28 Apr. 2000, entitled "Rapid Cooking Oven with an Integrated Wireless User Appliance to Allow Access to Remotely Maintained Digital Content";

(6) Ser. No. 60/200,280, filed 28 Apr. 2000, entitled "Method of Accessing Remotely Maintained Digital Content with a Wireless User Appliance Associated with a Rapid Cook Oven";

(7) Ser. No. 60/200,283, filed 28 Apr. 2000, entitled "Rapid Cooking Oven with an Integrated Wireless User Appliance for Remote Oven Control";

(8) Ser. No. 60/200,282, filed 28 Apr. 2000, entitled "Method of Remote Control of a Rapid Cooking Oven with a Wireless Communication Link";

(9) Ser. No. 60/200,266, filed 28 Apr. 2000, entitled "Rapid Cooking Oven with an Integrated Wireless User Appliance to Download Cooking Programs";

(10) Ser. No. 60/200,264, filed 28 Apr. 2000, entitled "Method of Downloading Cooking Programs into a Rapid Cooking Oven Utilizing a Wireless User Appliance";

(11) Ser. No. 60/200,268, filed 28 Apr. 2000, entitled "Method of Providing Cooking Control Programs to an Oven";

(12) Ser. No. 60/200,278, filed 28 Apr. 2000, entitled "Rapid Cooking Oven with Supporting Customer Site Having a Database of Available Cooking Control Programs";

(13) Ser. No. 60/200,267, filed 28 Apr. 2000, entitled "Method of Aggregating and Delivering Affiliated Goods and Services Based Upon Cooking Appliance Affinity";

(14) Ser. No. 60/200,276, filed 28 Apr. 2000, entitled "Rapid Cooking Oven with Supporting Electronic Commerce Forum";

(15) Ser. No. 60/200,265, filed 28 Apr. 2000, entitled "Rapid Cooking Oven with Supporting Customer Site Having Disparate but Linked Digital Content"; and

(16) Ser. No. 60/200,275, filed 28 Apr. 2000, entitled "Method of Supporting Cooking Operations Utilizing Aggregated and Linked Digital Content."

CONTINUATION-IN-PART RELATIONSHIP

This application is a continuation-in-part of U.S. patent application Ser. No. 09/815,222, filed 22 Mar. 2001, entitled "Rapid Cooking Oven with Broadband Communication Capability to Increase Ease of Use."

CROSS-REFERENCE TO RELATED APPLICATIONS

The present invention is a continuation-in-part of U.S. patent applications Ser. No. 08/863,671, filed 27 May 1997, now U.S. Pat. No. 5,927,265; Ser. No. 09/053,960, filed 2 Apr. 1998, now U.S. Pat. No. 5,990,466; Ser. No. 09/064,988, filed 23 Apr. 1998, now U.S. Pat. No. 6,140,626; Ser. No. 09/169,523, filed 9 Oct. 1998, now U.S. Pat. No. 6,008,483; and Ser. No. 09/199,902, filed 25 Nov. 1998, now U.S. Pat. No. 6,060,701. The present application claims the benefit of the filing date of U.S. Provisional Application Ser. No. 60/191,343, filed 22 Mar. 2000, entitled "High Speed Oven With Broadband Communication System and Wireless User Appliance," under 35 USC Sections 119 and 120.

CROSS-REFERENCE TO PRIOR ISSUED PATENTS

McKee U.S. Pat. No. 5,254,823, U.S. Pat. No. 5,434,390, and U.S. Pat. No. 5,558,793, commonly owned by Turbo-Chef, the assignee of the present invention and hereinafter referred to collectively as the "TurboChef Patents," are directed to quick-cooking ovens. The ovens described therein are primarily commercial ovens, partially because of the necessary size thereof, and partially because they lack features necessary in a residential consumer-operated oven (as opposed to an oven operated by a commercial employee). The TurboChef Patents are incorporated herein by reference as if fully set forth.

BACKGROUND OF THE INVENTION

In modern western economies workers are far more productive than previous generations. Work days are longer and many households have two or more individuals working full time jobs. Consequently, it is difficult for many families to prepare home-cooked meals or meals which are cooked from scratch. This is very advantageous for fast food and delicatessen operations.

Applicant is owner of the TurboChef patents identified above. These patents are directed to a quick cook oven which reduces cooking times to a small fraction of conventional cooking times. For example, it is possible to cook meals at ten times conventional cooking speeds. Accordingly, meats and vegetables can be cooked in minutes. The quick cook oven of the TurboChef patents is superior to competitive quick-cooking technologies in that the Turbo-Chef ovens produce a very high quality of food product by combining hot air impingement cooking and microwave cooking.

One problem which is common to all kitchen appliances is the reluctance of home owners to buy equipment which is unfamiliar to them. The adoption of microwave ovens was a relatively long process as many (usually older) users were intimidated by the devices. One problem that was present for microwave cooking systems which is not present for the TurboChef ovens is the relatively poor quality of food produced utilizing a microwave-only cooking system.

SUMMARY OF THE INVENTION

Rapid Cooking Oven with Broadband Communication Capability to Increase Ease of Use The present invention is directed to an approved oven preferably for use in a residence. The oven includes a cooking chamber, a programmable controller for executing program instructions, memory media for recording such executable program instructions, and at least one controllable cooking system which is under the control of the programmable controller. The cooking system provides a data-processing-controlled high speed cooking process which may be applied to food which is placed within the chamber of the oven. In accordance with the present invention, a plurality of cooking programs are recorded in the memory media of the oven. These cooking programs define a plurality of high speed cooking routines which are available for use with the oven. A gateway server is provided which is communicatively coupled with the programmable controller. The gateway server manages the communication of digital content which is at least in-part related to the operation and utilization of the improved oven. A broadband communication channel is provided which extends from a source of digital content. The source digital content is external to the residence. The broadband communication channel delivers particular digital content related to the oven through the gateway server. The gateway server operates to distribute the digital content within the residence, and such distribution includes the distribution of digital content to the programmable controller of the oven in order to facilitate cooking operations utilizing the oven.

In the preferred embodiment, the gateway server is housed in a location external to the oven; however, in alternative embodiments, the gateway server may be combined as an integral component of the oven itself. When the gateway server is external to the oven, it may consist of one or more devices which have data processing functionality. For example, the gateway server may comprise a home personal computing system, an internet appliance, or a home automation system.

In accordance with the preferred embodiment of the present invention, the gateway server and the programmable controller of the oven communicate through an input/output system in accordance with the predetermined protocol. In one particular instance of the present invention, the programmable controller of the improved oven may be communicatively coupled through the gateway server to a number of household devices which utilize or "consume" digital content. Such devices may include a home personal computing system, a home television system, a home video display system, or a wireless and portable internet appliance.

In one particular instance of the present invention, the oven may include a plurality of cooking energy sources. In that embodiment, the oven may be considered to be a "combination" cooking device. In accordance with the preferred, but not exclusive, embodiment of the present invention, the combination cooking may include microwave cooking and cooking through heated air streams. In such instance, the broadband communication channel is utilized to communication information relating to the cooking operation. It may in some particular instances communicate information which is utilized to control the combination cooking process.

Method of Utilizing a Broadband Communication Channel for Cooking

The present invention is directed to an improved method of cooking in a residence. An oven is provided which includes a number of integral subcomponents. Preferably, such subcomponents include at least a cooking chamber, a programmable controller for executing program instructions, memory media for recording executable program instructions, and at least one controllable cooking system which is under control of the programmable controller and which provides a data-processing-controlled high speed cooking process which may be applied to food placed in the chamber. A plurality of cooking programs are provided and recorded in the memory media of the oven. These cooking programs define a number of high speed cooking routines which are available for use with the oven. A gateway server is provided also which is communicatively coupled through the programmable controller of the oven. The gateway server manages the communication of digital content which is at least in-part related to the operation and utilization of the improved oven. A broadband communication channel is also provided. It extends from a source of digital content which is external to the residence. The broadband communication channel may be utilized to deliver a particular digital content related to the oven through the gateway server. The gateway server distributes the digital content within the residence, and this may include distribution of digital content to the programmable controller of the oven in order to facilitate cooking operations utilizing the oven. A broadband communication channel is utilized to direct digital content from a location remote from and external to the residence. The gateway server is then utilized to manage receipt and distribution of the digital content within the residence. This will include or may include the passing of at least a portion of the digital content to the programmable controller of the oven. Finally, at least a portion of the digital content which has been communicated into the residence is utilized to facilitate cooking operations utilizing the oven.

Rapid Cooking Oven with an Integrated Wireless User Appliance to Allow Access to Digital Content The present invention is related to an improved oven for use in the residence. The invention preferably includes an oven housing which includes a cooking chamber which is located within the oven housing. It further includes a programmable controller located in the oven housing for executing program instructions. A memory media is located in the housing for recording executable program instructions, and the memory media is operatively associated with the programmable controller. At least one controllable cooking system is located within the oven housing. At least one controllable cooking system is under the control of the programmable controller. It provides a data-processing-controlled high speed cooking process which may be applied to food which is placed in the chamber. A plurality of cooking programs are also provided and recorded in the memory media of the oven. These cooking programs define a number of high speed cooking routines which are available for execution by the programmable controller during cooking operations. A stationary wireless communication system is carried by the oven. Furthermore, a portable wireless appliance is provided. Preferably it includes a relatively small appliance housing, a central processing and associated electronic memory carried in a relatively small appliance housing, a display, and a portable wireless communication system which allows bidirectional communication between the portable wireless appliance and the stationary wireless communication system with a resident within the oven. In accordance with the preferred embodiment of the present invention, the stationary wireless communication system and the portable wireless communication system cooperate to pass digital content to the portable wireless appliance for presentation on the display.

The portable wireless appliance may be utilized for a number of purposes. One purpose would be to launch selected cooking programs. Another purpose would be to directly control oven operation. Another purpose would be the accessing of aggregated digital content which is maintained in the location outside the residence.

In accordance with the preferred embodiment of the present invention, the improved oven further includes a docking station. This docking station is preferably adapted for receiving the portable wireless appliance and locating it in a position which allows the user to view the display on the portable wireless appliance in a docked condition. In the most particular instance of the present invention which is described herein, the docking station is integral with the oven housing.

In accordance with the preferred embodiment of the present invention, the portable wireless appliance may be utilized to display a control interface, to receive operator commands, and to communicate those operator commands to the programmable controller in the oven.

The improved oven of the present invention may also be utilized may also be utilized in ovens which utilize a number of complimentary cooking systems, such as microwave and convection cooking systems.

Method of Cooking Utilizing a Combination Rapid Cooking Oven and Integrated Wireless User Appliance The present invention is directed to method of cooking utilizing a combination rapid cooking oven and an integrated wireless user appliance. An oven is provided and a cooking chamber is located within the oven. A programmable controller is provided and located in the oven housing for executing program instructions. Memory media is then utilized to record executable program instructions. At least one controllable cooking system is provided and located within the oven housing. The cooking system or systems is or are under control of the programmable controller. At least one controllable cooking system provides a data-processing-controlled high speed cooking process which may be applied to food which is placed in the chamber. A plurality of cooking programs are recorded in the media memory of the oven and they define a plurality of high speed cooking routines which are available for execution by the programmable controller during cooking operations. A stationary wireless communication system is also provided and carried by the oven housing. A portable wireless appliance is also provided. The portable wireless appliance includes a relatively small appliance housing. It further includes a central processing unit and associated electronic memory which is carried within a relatively small appliance housing. A display is also carried by the relatively small appliance housing. A portable wireless communication system is carried by the relatively small appliance housing and utilized for conducting bi-directional communications with the stationary communication system. The stationary wireless communication system and the portable wireless communication system cooperate to pass digital content to the portable wireless appliance for presentation on the display. Furthermore, the portable wireless appliance may be utilized to "launch" selected ones of the plurality of cooking programs. The portable wireless appliance may also be utilized to directly control at least one oven attribute while cooking operations are occurring. This may supplement, modify, or override at least one oven operation attribute. Furthermore, the portable wireless appliance may be utilized to access, receive and display digital content which has been aggregated in a location outside the residence. Preferably, but not necessarily, this may be accessible through the internet over telecommunication lines or through a wireless network.

In accordance with the preferred embodiment of the present invention, a docking station is provided which is adapted to receive the portable wireless appliance and to locate it in a position which allows a user to view the display when the portable wireless appliance is in a docked condition. In the particular instance of the preferred embodiment which is discussed herein, the docking station is shown as being integral with the oven housing.

A Rapid Cooking Oven with an Integrated Wireless User Appliance to Allow Access to Remotely Maintained Digital Content The present invention is directed to a rapid cooking oven with an integrated wireless user appliance which allows access to remotely maintain digital content. The oven of the present invention includes an oven housing, a cooking chamber, and at least one controllable cooking system located within the oven. It further includes a programmable controller located in the oven and memory media for recording executable program instructions. The memory media is operatively associated with the programmable controller. The controllable cooking system is under the control of the programmable controller. It defines a data processing controller high speed cooking process which may be applied to food placed in the oven chamber. A number of cooking programs are recorded in the memory media of the oven and they define a number of high speed cooking routines. The cooking routines are available for execution by the programmable controller during cooking operations. A stationary wireless communication is carried by the oven housing and a portable wireless appliance is provided. The portable wireless appliance is includes a small housing, a central processing unit, associated electronic memory, and a display. Furthermore, a portable wireless communication system is carried within the housing and it is utilized for conducting bidirectional communication with the stationary wireless communication system. At least one input device is carried by the small housing and is adapted to receive operator input. At least one graphical user interface is provided which is adapted for displaying digital content and for operating in conjunction with the at least one data input device for receiving display control instructions.

Method of Accessing Remotely Maintained Digital Content with a Wireless User Appliance Operatively Associated with a Rapid Cook Oven The present invention is directed to a method of accessing remotely maintained digital content with a wireless user appliance which is operatively associated with a rapid cooking oven. The oven of the present invention includes an oven housing, a cooking chamber, and at least one controllable cooking system located within the oven. It further includes a programmable controller located in the oven and memory media for recording executable program instructions. The memory media is operatively associated with the programmable controller. The controllable cooking system is under the control of the programmable controller. It defines a data processing controller high speed cooking process which may be applied to food placed in the oven chamber. A number of cooking programs are recorded in the memory media of the oven and they define a number of high speed cooking routines. The cooking routines are available for execution by the programmable controller during cooking operations. A stationary wireless communication is carried by the oven housing and a portable wireless appliance is provided. The portable wireless appliance is includes a small housing, a central processing unit, associated electronic memory, and a display. Furthermore, a portable wireless communication system is carried within the housing and it is utilized for conducting bidirectional communication with the stationary wireless communication system. At least one input device is carried by the small housing and is adapted to receive operator input. At least one graphical user interface is provided which is adapted for displaying digital content and for operating in conjunction with the at least one data input device for receiving display control instructions.

Method of Providing Disparate but Aggregated and Linked Digital Content for Rapid Cooking Systems The present invention is directed to a high speed oven which includes a broadband communication system and wireless user appliance. It is one objective of the present invention to utilize the broadband communication system to make the oven less intimidating to new users and a more effective cooking tool for users already familiar with the high speed oven.

It is another objective of the present invention to provide a wireless user appliance which can function both as a general purpose cooking portal, allowing access to internet transmitted digital content, as well as a wireless control device for the high speed oven.

It is yet another objective of the present invention to provide unique combinations of services and digital content which may be consumed by a user in his or her residence either over the wireless user appliance or through a home computing device.

Method of Remote Control of a Rapid Cooking Oven with a Wireless Communication Link The present invention is directed to a method of remote control of a rapid cooking oven with a wireless communication link. The oven of the present invention includes an oven housing, a cooking chamber, and at least one controllable cooking system located within the oven. It further includes a programmable controller located in the oven and memory media for recording executable program instructions. The memory media is operatively associated with the programmable controller. The controllable cooking system is under the control of the programmable controller. It defines a data processing controller high speed cooking process which may be applied to food placed in the oven chamber. A number of cooking programs are recorded in the memory media of the oven and they define a number of high speed cooking routines. The cooking routines are available for execution by the programmable controller during cooking operations. A stationary wireless communication is carried by the oven housing and a portable wireless appliance is provided. The portable wireless appliance is includes a small housing, a central processing unit, associated electronic memory, and a display. Furthermore, a portable wireless communication system is carried within the housing and it is utilized for conducting bi-directional communication with the stationary wireless communication system. At least one input device is carried by the small housing and is adapted to receive operator input. At least one graphical user interface is provided which is adapted for operating in conjunction with the at least one data input device for allowing the remote control of cooking operations of the rapid cooking oven.

Rapid Cooking Oven with an Integrated Wireless User Appliance to Download Cooking Programs The present invention is directed to a rapid cooking oven with an integrated wireless user appliance to download cooking programs. The oven of the present invention includes an oven housing and a cooking chamber located within the housing. Furthermore, at least one controllable cooking system is located within the oven housing. A programmable controller which is located in the oven housing is utilized for executing program instructions. A memory media is also provided for recording executable program instructions and it is operably associated with the programmable controller. A plurality of cooking programs are recorded in the memory media of the oven. These cooking programs define a number of high speed cooking routines which are available for execution by the programmable controller during cooking operations. A control interface is provided which is associated with the plurality of cooking programs. The control interface allows an operator to download additional cooking programs into the memory media. A stationary wireless communication system is also carried by the oven housing. It is operatively associated with the programmable controller. A portable wireless appliance is also provided. The portable wireless appliance includes a number of components. It has a relatively small appliance housing. It has a central processing unit which is carried by the relatively small appliance housing. It has a display carried by the housing which is utilized to display text and images. It further includes a portable wireless communication system which is carried within the housing which is utilized for conducting bi-directional communication with the stationary wireless communication system. At least one input device is carried by the relatively small appliance housing and it is utilized to receive operator input. This may comprise a button, keyboard, or touch pad. It may also include a touch screen or any other means for receiving operator input into the portable wireless appliance. At least one graphical user interface is provided which is adapted for display on the screen of the portable wireless appliance. It is utilized to display the control interface. It operates in conjunction with the at least one input device for controlling downloading of selected additional cooking programs into the memory media.

Method of Providing Cooking Control Programs to an Oven

The present invention is directed to a method of providing cooking control programs to an oven. A commodity oven is provided. A commodity oven includes mechanical components such as a cooking chamber. A programmable controller is provided for executing program instructions and a memory media is also provided for recording executable program instructions. At least one controllable cooking energy source is provided within the oven housing and is utilized to cook foods which are placed within the chamber. Preferably at least one controllable cooking energy source is under control of the programmable controller. It defines a data-processing-control high speed cooking process which may be selectively applied to foods in the chamber. A plurality of cooking control programs are a recorded memory of the oven and they define a plurality of high speed cooking routines which are available for use with the oven. They have associated with them a plurality of cook settings. An input/output system is also provided allowing programs and data to be communicated into the programmable controller.

In accordance with the preferred embodiment of the present invention, a plurality of the commodity ovens are distributed to a plurality of users. The users individually have access to a broadband communication channel utilizing data processing systems which are under their control. The manufacturer of the oven or some affiliate then generates additional cooking control programs which include new particular cook settings which are empirically determined (through experimentation and practical use) to optimize cooking operations for particular food items. In this manner, over time a better understanding of how the oven may be effectively utilized can be embodied in new and different cooking control programs. The oven manufacture or some affiliate maintains a database of these additional cooking control programs. Furthermore, the oven manufacturer or an affiliate establishes a customer site which is accessible to the plurality of users through the broadband communication channel utilizing those data processing systems under their control. The site permits authorized customers to access the database through the customer site over the broadband communication channel utilizing those data processing systems under their control. The site will allow authorized customers to download selected ones of the additional cooking control programs for loading into the memory media of the commodity oven to allow utilization during cooking operations.

Rapid Cooking Oven with Supporting Customer Site Having a Database of Available Cooking Control Programs The present invention is directed to an improved rapid cooking program to an oven. The oven includes mechanical components such as a cooking chamber. A programmable controller is provided for executing program instructions and a memory media is also provided for recording executable program instructions. At least one controllable cooking energy source is provided within the oven housing and is utilized to cook foods which are placed within the chamber. Preferably at least one controllable cooking energy source is under control of the programmable controller. It defines a data-processing-control high speed cooking process which may be selectively applied to foods in the chamber. A plurality of cooking control programs are a recorded memory of the oven and they define a plurality of high speed cooking routines which are available for use with the oven. They have associated with them a plurality of cook settings. An input/output system is also provided allowing programs and data to be communicated into the programmable controller.

Method of Aggregating and Delivering Affiliated Goods and Services Based Upon Cooking Appliance Affinity The present invention is directed to a method of aggregating and delivering affiliated goods and services based upon cooking appliance affinity. A rapid cooking oven is an integral part of the invention. The rapid cooking oven includes a cooking chamber and at least one controllable cooking energy source. Additionally, the oven includes a programmable controller for executing program instructions and memory media for recording executable program instructions. The controllable cooking energy source is under control of the programmable controller and provides a data-processing-controlled high speed cooking process for food placed in the chamber. A plurality of cooking programs are provided and recorded in memory in the memory media of the oven. These define a number of high speed cooking routines which are available to the user for cooking operations. A number of input/output systems are also provided to allow at least one of programs and data to be communicated into the programmable controller.

In addition, the present invention requires that the manufacturer of the oven or a commercial affiliate establish a number of commercial relationships with a plurality of providers of goods and services all of which relate to cooking. Then, the manufacturer of the oven or an affiliate establishes a customer site which is accessible to users and/or owners of the ovens through use of a broadband communication channel and a data processing system. In its preferred instance, the present invention represents an internet site which is accessible utilizing conventional computing systems. The site will permit authorized customers to access the database through the customer site over the communication channel using their data processing systems, such as home computes, internet appliances, and the like. The site will allow authorized customers to purchase goods and services from the affiliated providers of goods and services.

Rapid Cooking Oven with Supporting Electronic Commerce Forum

The present invention is directed to a rapid cooking oven with a supporting electronic commerce forum. A rapid cooking oven is an integral part of the invention. The rapid cooking oven includes a cooking chamber and at least one controllable cooking energy source. Additionally, the oven includes a programmable controller for executing program instructions and memory media for recording executable program instructions. The controllable cooking energy source is under control of the programmable controller and provides a data-processing-controlled high speed cooking process for food placed in the chamber. A plurality of cooking programs are provided and recorded in memory in the memory media of the oven. These define a number of high speed cooking routines which are available to the user for cooking operations. A number of input/output systems are also provided to allow at least one of programs and data to be communicated into the programmable controller.

In addition, the present invention requires that the manufacturer of the oven or a commercial affiliate establish a number of commercial relationships with a plurality of providers of goods and services all of which relate to cooking. Then, the manufacturer of the oven or an affiliate establishes a customer site which is accessible to users and/or owners of the ovens through use of a broadband communication channel and a data processing system. In its preferred instance, the present invention represents an internet site which is accessible utilizing conventional computing systems. The site will permit authorized customers to access the database through the customer site over the communication channel using their data processing systems, such as home computes, internet appliances, and the like. The site will allow authorized customers to purchase goods and services from the affiliated providers of goods and services.

Rapid Cooking Oven with Supporting Customer Site Having Disparate but Linked Digital Content The present invention is directed to an improved oven which is preferably for use in a residence. The oven includes a cooking chamber and at least one controllable cooking system. The oven further includes a programmable controller which is located within the oven and which is utilized for executing program instructions. A memory media is also provided within the oven for recording executable program instructions. The controllable cooking system is under control of the programmable controller. This provides a data-processing-controlled high speed cooking process which may be applied to food which is placed in the chamber. In accordance with the present invention, a plurality of cooking programs are recorded in the memory media of the oven. These cooking programs define a number of high speed cooking routines which are available for use with the oven. At least one data processing system is also provided which is communicatively coupled to the programmable controller for managing the communication of digital content which is at least in-part related to the operation and utilization of the improved oven. Furthermore, a broadband communication channel is provided. The communication channel extends from a source of digital content which is external to the residence, into the residence. It is utilized for delivering particular predetermined and aggregated digital content related to the oven through the data processing system. The digital content may be distributed within the residence, this includes distribution to the programmable controller of the oven in order to facilitate cooking operations utilizing the oven.

A customer site is provided which is accessible to authorize users which have a predetermined relationship to the oven. Typically, this will represent purchasers of the oven. The customer site is accessible to these authorized users through the broadband communication channel. Preferably, it will be accessed utilizing at least one data processing system which is under their control. The aggregated digital content which is maintained at the customer site is available to authorized users. It preferably includes a plurality of material types from the following disparate types of digital content: (1) a plurality of cooking programs which may be executed by the programmable controller of the oven to control cooking operations; (2) a plurality of recipes; (3) nutritional information relating to the recipes; (4) tutorial materials; and (5) multimedia materials.

The aggregated digital content is organized into a plurality of databases. Preferably there are predetermined logical database linkages which are established between particular elements in the plurality of databases. For example, aggregated digital content from different originating sources may be coded in a manner which "tags" particular portions of a database to other particular portions of other databases. For example, a particular recipe for a Chinese food dish may be "tagged," "linked," or otherwise identified to multimedia materials relating to Chinese cooking, tutorial materials relating to particular cooking procedures, nutritional information relating to the nutritional content of the dish. Additionally, it may be linked to one or more cooking programs which are maintained in a database and which are available for "downloading" into the oven and utilization during the cooking operation.

When the site detects that the user has accessed a particular data element or elements within the databases, the other particular linked data elements are made automatically available to the customer through the customer site. This greatly simplifies utilization of the oven and should generally increase the owner's interest in using the oven and the related customer site as a means for exploring different types of cooking and improving those skills.

Method of Supporting Cooking Operations Utilizing Aggregated and Linked Digital Content The present invention is directed to a method of supporting cooking operations utilizing aggregated and linked digital content. The oven includes a cooking chamber and at least one controllable cooking system. The oven further includes a programmable controller which is located within the oven and which is utilized for executing program instructions. A memory media is also provided within the oven for recording executable program instructions. The controllable cooking system is under control of the programmable controller. This provides a data-processing-controlled high speed cooking process which may be applied to food which is placed in the chamber. In accordance with the present invention, a plurality of cooking programs are recorded in the memory media of the oven. These cooking programs define a number of high speed cooking routines which are available for use with the oven. At least one data processing system is also provided which is communicatively coupled to the programmable controller for managing the communication of digital content which is at least in-part related to the operation and utilization of the improved oven. Furthermore, a broadband communication channel is provided. The communication channel extends from a source of digital content which is external to the residence, into the residence. It is utilized for delivering particular predetermined and aggregated digital content related to the oven through the data processing system. The digital content may be distributed within the residence, this includes distribution to the programmable controller of the oven in order to facilitate cooking operations utilizing the oven.

A customer site is provided which is accessible to authorize users which have a predetermined relationship to the oven. Typically, this will represent purchasers of the oven. The customer site is accessible to these authorized users through the broadband communication channel. Preferably, it will be accessed utilizing at least one data processing system which is under their control. The aggregated digital content which is maintained at the customer site is available to authorized users. It preferably includes a plurality of material types from the following disparate types of digital content: (1) a plurality of cooking programs which may be executed by the programmable controller of the oven to control cooking operations; (2) a plurality of recipes; (3) nutritional information relating to the recipes; (4) tutorial materials; and (5) multimedia materials.

The aggregated digital content is organized into a plurality of databases. Preferably there are predetermined logical database linkages which are established between particular elements in the plurality of databases. For example, aggregated digital content from different originating sources may be coded in a manner which "tags" particular portions of a database to other particular portions of other databases. For example, a particular recipe for a Chinese food dish may be "tagged," "linked," or otherwise identified to multimedia materials relating to Chinese cooking, tutorial materials relating to particular cooking procedures, nutritional information relating to the nutritional content of the dish. Additionally, it may be linked to one or more cooking programs which are maintained in a database and which are available for "downloading" into the oven and utilization during the cooking operation.

When the site detects that the user has accessed a particular data element or elements within the databases, the other particular linked data elements are made automatically available to the customer through the customer site. This greatly simplifies utilization of the oven and should generally increase the owner's interest in using the oven and the related customer site as a means for exploring different types of cooking and improving those skills.

BRIEF DESCRIPTION OF THE DRAWING

The above and related objectives, features and advantages of the present invention will be more fully understood by reference to the following detailed description of the presently preferred, albeit illustrative, embodiments of the present invention when taken in conjunction with the accompanying drawings wherein:

FIGS. 1A and 1B are a block diagrams and schematic representations of a residence equipped with a high speed oven, a broadband communication channel, a service provider and content aggregator which provides custom-tailored materials to the residence in an on-demand basis, as well as affiliated goods providers, order fulfillment, and service providers;

DETAILED DESCRIPTION OF THE PREFERRED EMBODIMENTS

Figure 1B:
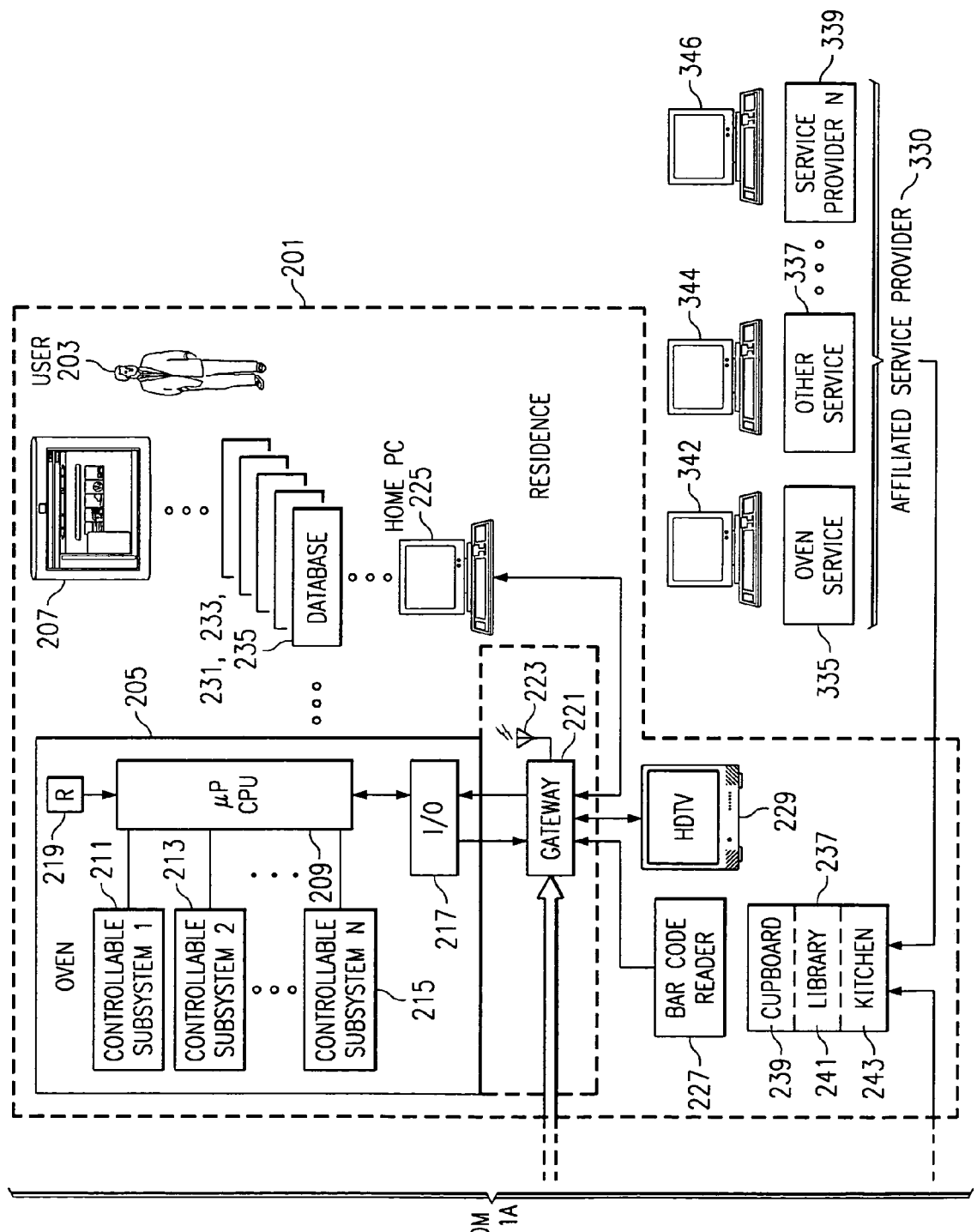

While the present invention will be described in terms of a stand-alone or counter-top oven suitable for use in a residence, it will be obvious to those skilled in the cooking art that an oven according to the present invention may alternatively be a wall unit (incorporated into a wall such that only the front of the unit is exposed) or a console model having feet adapted to rest on the floor, or other variations thereof. Indeed, the residential oven may find utility in a commercial establishment, especially a relatively small commercial establishment, or other heretofore unanticipated locations.

While a commercial oven of the type described in the TurboChef Patents may have dimensions of 30"×30"×33", the dimensions of a preferred embodiment of a residential oven according to the present invention are a height of approximately 15 inches (excluding the additional 3 inches required for adjustable feet), a width of approximately 28 inches, and a depth of approximately 25 inches (excluding the additional approximately two inches required for the handle projection from the front of the unit). The weight of the 15"×28"×25" residential unit is approximately 140 pounds, substantially lighter than the 540 pounds of the 30"×30"×33" commercial oven described in the TurboChef patents.

The reference numerals used herein in FIGS. 9–13 generally correspond to those used in the drawings of the TurboChef Patents to indicate elements of similar structure or similar function.

FIGS. 1A and 1B are block diagram and schematic representations of a residence equipped with the quick cook oven with a broadband communication system and a wireless user appliance, which depicts the relationship between the user, the residence, and the oven with a broadband communication channel, a service provider, aggregated digital content, goods providers, and service providers. More particularly, as is shown in FIG. 1B, residence 201 is under the control of user 203. Residence 201 is equipped with a quick cook oven 205 in accordance with the present invention. A wireless communication appliance 207 is provided for use by user 203 to allow communication of information and commands between user 203 and other systems including oven 205.

In accordance with the preferred embodiment of the present invention, oven 205 is equipped with a central processing unit 209 which is resident within the oven housing. Oven 205 includes a plurality of controllable subsystems 211, 213, and 215 which are under direct control of central processing unit 209 of oven 205. Oven 205 may also be equipped with a wireless receiver 219 to allow communication between oven 205 and wireless user appliance 207. Oven 205 further includes an input/output system 217 which is also under the control of central processing unit 209 and which allows serial and parallel communication of data, control signals, and digital content.

In accordance with one particular instance of the present invention, oven 205 communicates through input/output system 217 with a gateway appliance 221. The gateway appliance may be home computer, a set top cable box, a internet appliance, a combination television and internet appliance (such as "Web TV"), a home automation system, a satellite system, or any other system which allows relatively broadband bi-directional communication.

For purposes of this application, the term "broadband" is defined to mean data rates which can be obtained using relatively low-end modem connections up to the highest data rates possible commercially. This may manifest itself in the form of an optical communication system, a cable system, a satellite television system, or a DSL internet connection. In accordance with one instance of the present invention, gateway 221 is equipped with the transmission and reception system 223 which allows for wireless communication between wireless user appliance 207 and the central processing unit 209 of oven 205. Additionally, gateway 221 may be communicatively connected to one or more personal computers such as home PC 225. Additionally, gateway 221 may be communicatively and operatively connected with one or more television or video display systems, such as the high definition television 229 which is depicted in FIG. 1. Also, gateway 221 may be operatively connected with a code reading device such as a bar code reader 227. Currently, there is great interest in utilization of bar code readers for the management of information. It is likely that the current interest in bar code readers will be supplanted by more user-friendly systems such as passive or active radio tagging systems.

As is depicted in the view of FIG. 1B, residence 201 includes a plurality of household subsystems such as cupboard or pantry 239, library 241, and kitchen 243. As will be discussed in detail below, these household subsystems may be accessed on a predetermined basis by one or more providers of goods and services.

As is depicted in FIGS. 1A and 1B, a bi-directional communication channel 245 is established between gateway 221 within residence 201 and a communication network 247 such as the World Wide Web, a wide area network, or a local area network, which are collectively depicted as WWW/LAN/WAN 247. User 203 may utilize wireless user appliance 207, and or home PC 229, and or gateway 221, and/or central processing unit 209 of oven 205 to communicate bidirectionally over bi-directional communication channel 245 and WWW/LAN/WAN 247. One or more television systems such as HDTV 229 may operate to receive programmed content over or through one or more of gateway 221, and/or home PC 225, and/or central processing unit 229.

Service provider 249 communicates through WWW/LAN/WAN 247 and bidirectional communication channel 245 with either user 203 or one or more processing subsystems within residence 201. Service provider 249 is typically, but not necessarily, the supplier of quick cook oven 205 to user 203. Preferably, but not necessarily, service provider 249 has an on-going commercial relationship with user 203 in order to supply digital content to user 203 in a way which enhances the usefulness of quick cook oven 205, and which in general empowers user 203 to develop a quick and deep understanding of how quick cook oven 205 can be utilized to improve meal preparation and entertainment. Additionally, service provider 249 has commercial and contractual relationships with affiliated goods providers 297 and affiliated service providers 330. The relationships between service provider 249 and the affiliated goods providers and affiliated service providers 330 will describe in detail below.

Service provider 249 operates in part as a content aggregator. Service provider assembles aggregated content 263 and charges user 203 (and many other users like user 203) for access to the aggregated digital content 263. Because residence 201 is equipped with a variety of end devices, the content may be consumed by user 203 through a number of data-processing enabled appliances such as wireless user appliance 207, home PC 225, and high definition television 229.

In the view of FIG. 1B, the aggregated content 263 is depicted as a number of types of databases. Service provider 249 may aggregate a number of different recipe databases such as recipe databases 265, 267, 269. The recipe databases may be from a different sources. For example, one recipe database may be for Chinese food. Another database may be for foods from a famous restaurant and/or famous chef. The recipe databases 265, 267, 269 may comprise an array of multi-dimensional databases which are sortable, searchable, and addressable through keyword searches and/or table of content listings. The concept is to provide each user such as user 203 with a digital library of a great number of recipes, from different recipe sources, covering different recipe types.

Also, as is depicted in FIG. 1B, the aggregated content 263 may include a number of cook setting databases such as cook setting databases 271, 273, 275. These databases are particular device settings which are usable by CPU 209 of oven 205 in order to cook a particular food, food type, or a particular recipe. As is depicted in the view of FIG. 1A, there are a plurality of controllable subsystems, such as controllable subsystems 211, 213, 215 which are under the control of central processing unit 209 of oven 205. Each of these controllable subsystems may include variables which may be set and reset by either user 203 or service provider 249. In one preferred embodiment of the present invention, the cook settings of cook settings databases 271, 273, 275 may map to particular recipes or databases of recipes within the recipe databases 265, 267, 269. For example, there may be particular cook settings available for cooking roasted duck. Once the user 203 selects the recipe for roasted duck in one of the databases 265, 267, 269, the user 203 may set or reset controllable variables for one or more of the controllable subsystems 211, 213, 215 of oven 205 in order to optimize the cooking process for that particular recipe for roasted duck. It is easy to appreciate that there may be thousands of recipes in the recipe database and this may result in thousands of particular settings in the cook setting databases 271, 273, 275.

Also, as is depicted in FIG. 1B, a plurality of nutrition databases 270, 272, 274 may be provided. A depiction in the view of FIG. 1 is of three nutrition databases. In practice, there may be hundreds of nutrition databases which are maintained as aggregated content 263. Once again, particular pages or items within the nutrition database may correspond or relate to particular recipes in the recipe databases 263, 265, 267, 269 and may have associated with it particular cook setting configurations from the cook setting databases 271, 273, 275. Utilizing the nutrition databases 270, 272, 274, service provider 259 may provide useful information to user 203 in order to meet special dietary needs (in the event that the user has a restricted diet, due to diabetes, high cholesterol, or the like) or which meet a particular goal set by user 203 (such as weight loss, physical conditioning, body building, or the like).

Additionally, as is depicted in FIG. 1B, aggregated content 263 includes a plurality of tutor systems 281, 283, 285. In practice, there may be hundreds of tutor systems available. Tutor systems differ from the recipes in the recipe databases 265, 267, 269 in that they teach particular skills or processes which are necessary for particular cooking operations. A tutor system may take the form of textual material, audio material, or audio/visual materials. Once again, each particular recipe within the recipe databases 263, 265, 267, may have associated with it one or more pages or items within an array of tutor system databases which may be applicable to a particular recipe. For example, there may be particular items within the array to tutor system databases which teach one how to dress a duck prior to roasting, or which teach one how to make a particular gravy or sauce in connection with the roasting of a duck.

In this manner, there are extensive, logical, table of content and data processing links between the arrays of databases within an aggregated content 263. For example, one recipe with the recipe databases 263, 265, 267 may map to a number of alternative available cook settings within cook settings databases 271, 273, 275. This recipe may also map to a number of particular items or pages within the nutrition databases 270, 272, 274. A particular task to be performed in order to execute a particular recipe may be learned by user 203 by accessing one or more linked items within the database of tutor systems which include tutor systems 281, 283, 285. For a more rich experience, an array of multimedia libraries 287, 289, 291 may be provided and made available through service provider 249. The multimedia library may be made up of a number of episodes of preexisting programming, such as particular episodes of "Martha Stewart," or other well known media personalities in the field of cooking. Then multimedia library may represent a very large array of programming content available from a variety of differing programming sources. Provided that bi-directional communication channel 245 is sufficiently broad and robust, it may be possible to stream the video content from one or more databases of multimedia libraries 287, 289, 291 to either home PC 225, HDTV 229, or even wireless user appliance 207.

As is depicted in FIG. 1B, the aggregated content 203 may include items which are particular or unique to residence 201 or oven 205 within residence 201. For example, a kitchen inventory database 279 may be provided which allows user 203 to track his or her cupboard or pantry inventory. User 203 may access the kitchen inventory from either the wireless user appliance 207, the home PC 225, gateway device 221, or work/away PC 249. Kitchen inventory 279 may contain logical, table of content, or data processing links to other databases within the aggregated content 263. This would allow user 203 to do meal preparation (that is, a selection and execution of particular recipes) based upon actual kitchen inventory as determined by kitchen inventory database 279. Therefore, a data processing system which is under control of either service provider 249 or user 203 may perform an analysis of the kitchen inventory and identify various items within the recipe databases 265, 267, 269 and/or nutrition databases 270, 272, 274 which can be cooked with the items that are available within the cupboard or pantry of residence 201.

Additionally, aggregated content 263 may include an online store 281 which allows user 203 to order goods or services through affiliated goods provider 297 and/or affiliated service providers 233. Additionally, online store 281 may contain proprietary prepacked foods which are manufactured under the control of service provider 249 and adapted especially for cooking utilizing the quick cook oven 205 within residence 201. As is shown, orders which are placed on the online store 281 for prepacked foods 331 may be delivered through order fulfillment house 329 directly to residence 201. The prepacked foods 331 may be frozen food items or frozen meals which include multiple food items which are prepackaged, preferably in an uncooked or partially cooked condition. User 203 may utilize quick cook oven 205 to cook the food item or prepacked meal with particular cook settings in order to optimize the cooking operation.

Also, as is depicted in FIG. 1B, aggregated content 263 may include a number of service databases such as service databases 293, 295. The service database may include detailed histories of the service operations performed on the quick cook oven.

Service provider 249, and affiliated goods providers 297 may communicate electronically utilizing bidirectional communication channel 245 and WWW/WAN 247. Order fulfillment house 329 may be utilized to make physical delivery of the goods to residents 201 for placement in cupboard or pantry 239, library 241, or kitchen 243. In accordance with the preferred embodiment of the present invention, affiliated service providers 330 may include oven service company 335, and other service companies 337, 339. These affiliated service providers 330 have data processing systems 342, 344, 346 under their control. The bi-directional communication channel 245 and WWW/LAN/WAN 247 are utilized to consummate a transaction which involves user 203, service provider 249, and affiliated service provider 330. In both the sale of goods and services, service provider 249 may not receive compensation for each sale of goods or sale of services consummated utilizing the commercial relationship between service provider 249 and user 203. In this manner, service provider 249 is not only an aggregator of digital content, but is also an aggregator of goods providers and service providers.

The present invention also contemplates commercial and communication relationship between user 203, service provider 249 and specialty service affiliates 317. The specialty service affiliates may comprise medical consultants 321 and nutrition consultants 323. Medical consultant and nutritional consultants 321, 323 communicate utilizing data processing systems 325, 327 which are under their control. Communication is conducted utilizing bidirectional communication channel 245 and WWW/LAN/WAN 247. Preferably, a contractual relationship 319 exists between service provider 249 and the specialty service affiliates 317. There are privacy issues and doctor-patient confidentiality issues which mandate special treatment of the specialty service affiliates and which may result in special treatment of the data which is generated as a result of the relationship between user 203 and specialty service affiliates 317 and service provider 249. The specialty service affiliates 317 may be utilized to monitor data directed over the bi-directional communication channel 245 and WWW/LAN/WAN 247 concerning the quantity and types of food which are being purchased and/or consumed by user 203 based upon data derived from the affiliated service providers 330, affiliated goods providers 297, databases which are specific to user 203 with an aggregated content 263 (such as kitchen inventory 279 and online store 281). This allows the specialty service affiliates to more closely monitor dietary information relating to user 203, and provide better advice and treatment for the particular medical conditions, problems, or personal goals held by user 203.

Also, as is depicted in FIG. 1A, service provider 249 has a number of contractual relationships 257, 259, 261 between it and the owners of particular pieces of aggregated content 263. The aggregated content 263 may be accessed by service provider 249 through direct access (in the case of assets or resources within its own ownership and control) as well as utilizing internet links such as TCP/IP links. The commercial relationship between service provider 249 and the owners and proprietors of certain aggregated content may be embodied by the contracts 257, 259, 261 and may take the form of a revenue sharing relationship for "hits" generated for those sites by service provider 249. In many instances, this takes the form of a small monetary payment for each hit which is directly associated with service provider 249. This is accounted for typically through the monitoring or tracking of internet traffic from the internet site of service provider 249.

In accordance with one instance of the preferred embodiment, service provider 249 interacts with its customers including user 203 utilizing a graphical user interface 257. In its practical implementation, graphical user interface 257 will be made up of a family of cascading graphical user interfaces which are linked one to the other logically or through TCP/IP links. In accordance with the preferred implementation of the present invention, service provider 249 provides other data processing or communication services as part of its relationship with user 203. The other services 255 are represented in FIG. 1A as including e-mail services, calendaring services, address book services, and messaging services. These basic database and communication services are one way that service provider 249 builds user loyalty and secures its commercial relationships with the content aggregators, affiliated goods providers 297, affiliated service providers 330, and specialty service affiliates 317.

In accordance with the preferred embodiment of the present invention, fragmentary portions of aggregated content 263 may be maintained locally in memory within residence 201. This is depicted graphically in the view of FIG. 1B as database elements 231, 233, 235. The memory resident in wireless communication device 207, oven 205, home PC 225, or gateway 221 may be utilized to record items which have been downloaded through service provider 249 into residence 201. In this manner, user 203 may maintain one or more sets of fragmentary copies of selected portions of the aggregated content 263 within residence 201 in the disk, RAM or ROM memory of one of more of these end devices. In this manner, the favorite recipes, nutritional information, tutorial materials and/or multimedia materials may be maintained locally in memory within residence 201. This is beneficial in the event that bidirectional communication channel 245 is interrupted for some reason or if the service provider 249 site is inoperative or "down." In practice, a relatively small amount of data will be maintained in databases 231, 233, 235. But this information is likely more useful to user 203 than the other information maintained in aggregated content 263 and having it maintained locally is advantageous for user 203.

In accordance with one particular instance of the present invention, order fulfillment house 329 may have a contractual relationship 333 with user 203 which allows limited or predetermined access to residence 201 to allow order fulfillment house 329 to deliver appliances, cupboard provisions, or library and/or tutorial materials to residence 201 and in particular to kitchen 243, library 241, and cupboard or pantry 239. This contractual relationship will define the amount of access provided by user 203 to order fulfillment house 329. This is especially useful in view of the emerging services such as "Webvan" and "PeaPod" food delivery services. It may be beneficial to have certain areas within residence 201 which are accessible to order fulfillment house 329. A service truck will run a route and utilize a pass code and/or key to access a locker and/or refrigerator and/or service bay area related to or associated with residence 201 so that deliveries may be made when user 203 is away from residence 201. Similar contractual relationships may be obtained between user 203 and affiliated service providers 330, which allow some limited access for purposes of providing service to residence 201 and user 203.

Service provider 249 may also have contractual arrangement 317 with specialty service affiliates 321, 323. In the example of FIG. 1A, specialty service affiliate 321 is a medical doctor which has a relationship with user 203 and also with service provider 249. The doctor may access information from either or both of user 203 and service provider 249 in order to gather data which may be useful in the medical evaluation and counseling of user 203. The other specialty service affiliate 317 comprises a nutritionist 323 which also has a similar relationship with user 203 and service provider 249. These specialty service affiliates 317 have special legal obligations to user 203, especially with regard to the privacy of data. They interact utilizing data processing systems 325, 327 which are under their control and communicate utilizing bi-directional communication channel 245 and/or WWW/LAN/WAN 247 in order to obtain information which may provide a good indication of the quantity and types of foods consumed by user 203. This information may be utilized in the medical and nutritional consultation which the specialty service affiliates 317 may provide to user 203. In particular, the specialty service affiliates may want to monitor the kitchen inventory 279 for user 203, but may also monitor other information such as recipes which have been downloaded by user 203 and nutritional database information which is downloaded by user 203. This information would not supplant the process of consulting with a patient, but it could supplement the information gathered through consultation and provide the specialty service affiliates 317 with a special insight to user 203 and his or her cooking and/or eating habits.

Figure 2:
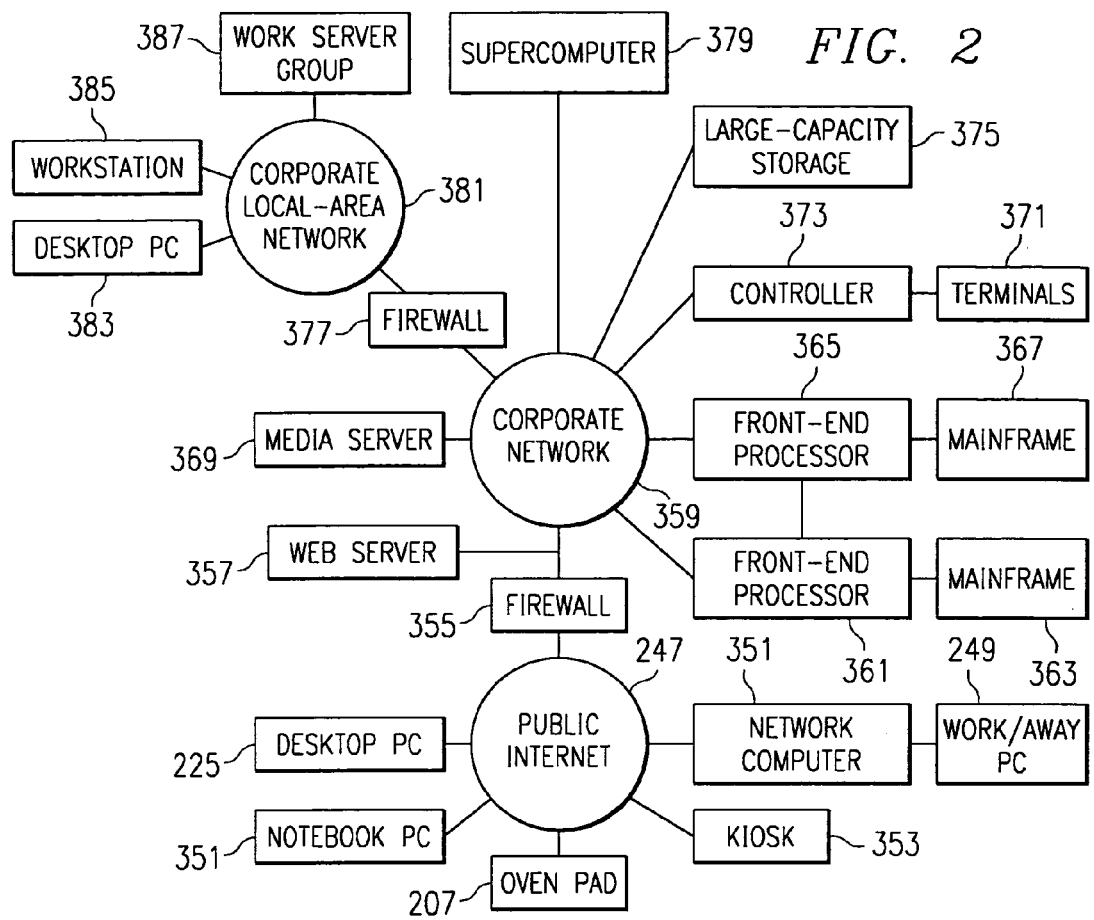
FIG. 2 is a schematic and block diagram representation of one instance of a data processing system utilized by the service provider to deliver the content.

FIG. 2 is a simplified block diagram and pictorial representation of one type of computer architecture which may be utilized by service provider 249 in order to interact with user 203 and other users, as well as affiliated goods providers 297, specialty service providers 317, affiliated service providers 330, as well as to provide which digital content from the aggregated content 263 into one or more end devices maintained by user 203 within residence 201. As is shown in this view, a variety of end devices may be utilized by one or more users to access public internet 247. These include desk top PC 225 (which is the home PC 225 depicted in FIG. 1B), notebook PC 351, wireless communication device 207 (of FIG. 1B), kiosk 353, and network computer 351. In accordance with the present invention, a work/away PC 247 (of FIG. 1A) may communicate through network computer 351 (which may be a workplace network) in order to gain access to public internet 247.

A firewall 355 is established between public internet 247 and data processing components which are under the direct control of service provider 249. These data processing devices include a web server 351 which is utilized to manage the cascading graphical user interfaces which are made available to the users, as well as to manage the traffic or "hits" to the site. The web server 351 may be connected to a corporate network 357. Various components within the control of service provider 249 may be connected through corporate network 359 and selectively made available by web server 351 through firewall 355 to one or more end users. For example, media server 369 may be provided on the corporate network. If the media server 369 is utilized to maintain and manage aggregated multimedia content such as the multimedia library databases 287, 289, 291. The corporate network 359 may also be operatively connected to various front end processors 361, 365 which manage the business "front end" of the enterprise. These are in turn connected to mainframe computers 363, 367 which maintain the data necessary to run the business. Various employees may connect through corporate network 359 through devices such as terminals 371 and controller 373. For large databases, large capacity storage 375 may be provided which is also accessible through corporate network 359. For data processing intensive operations, super computer 379 may be connected through corporate network 359. This may be especially useful for compression and/or encryption algorithms or processes which must be performed in order to securely transmit valuable digital content over the insecure public internet 247. In one particular instance of the present invention, additional firewalls may be provided, such as firewall 377. A corporate local area network 381 may be provided connecting through firewall 377 to corporate network 359. The corporate local area network 381 may be connected to desk top PCs 383, work stations 385, and/or work group servers 387.

Figure 3:
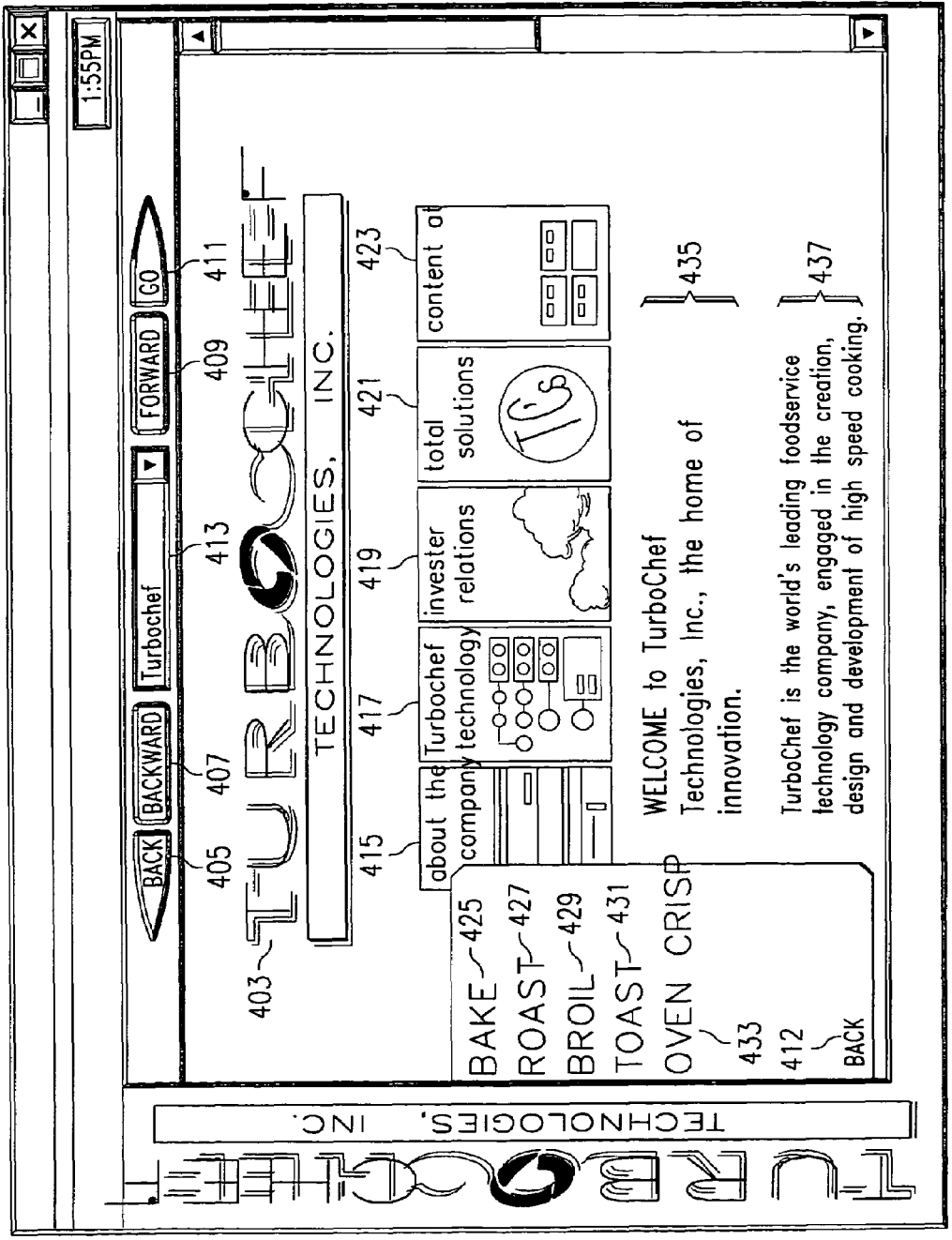
FIG. 3. is a pictorial representation of one exemplary graphical user interface which may be displayed on either a wireless communication device or a home computing system.

FIG. 3 is a pictorial representation of one exemplary graphical user interface 401. The graphical user interface 401 of FIG. 3 may be displayed in any or all of wireless communication device 207, gateway appliance 221, home PC 225, or HDTV 229. It may also be accessed from outside of residence 201 by work/away PC 249. Graphical user interface 401 includes a number of graphical and textual elements, some of which are "active" elements which may be utilized for command, control, communication purposes, while others are "passive" elements which may be utilized to communicate information to the end user. In the exemplary graphical user interface 401 of FIG. 3, a variety of control buttons 405, 407, 409, 411, 412 are provided which allow the operator to scroll forward or backward or otherwise navigate through the series of HTML pages. A pull down menu 403 may be provided to allow the user 203 to select a particular destination within the internet site of service provider 249. Go button 411 is utilized to perform a "GO TO" function in response to destination selected through pull down menu 413. Preferably, a prominent logo 403 is provided in graphical user interface 401. A plurality of graphical elements 415, 417, 419, 421, 423 are provided which are "active elements" which may be utilized to perform GO TO operations quickly and intuitively. A plurality of active text portions 425, 427, 429, 431, 433 may be provided in order to also allow navigation through the website. Textual portions 435, 437 are provided which are not active and which merely serve to provide information to the user.

Figure 4:
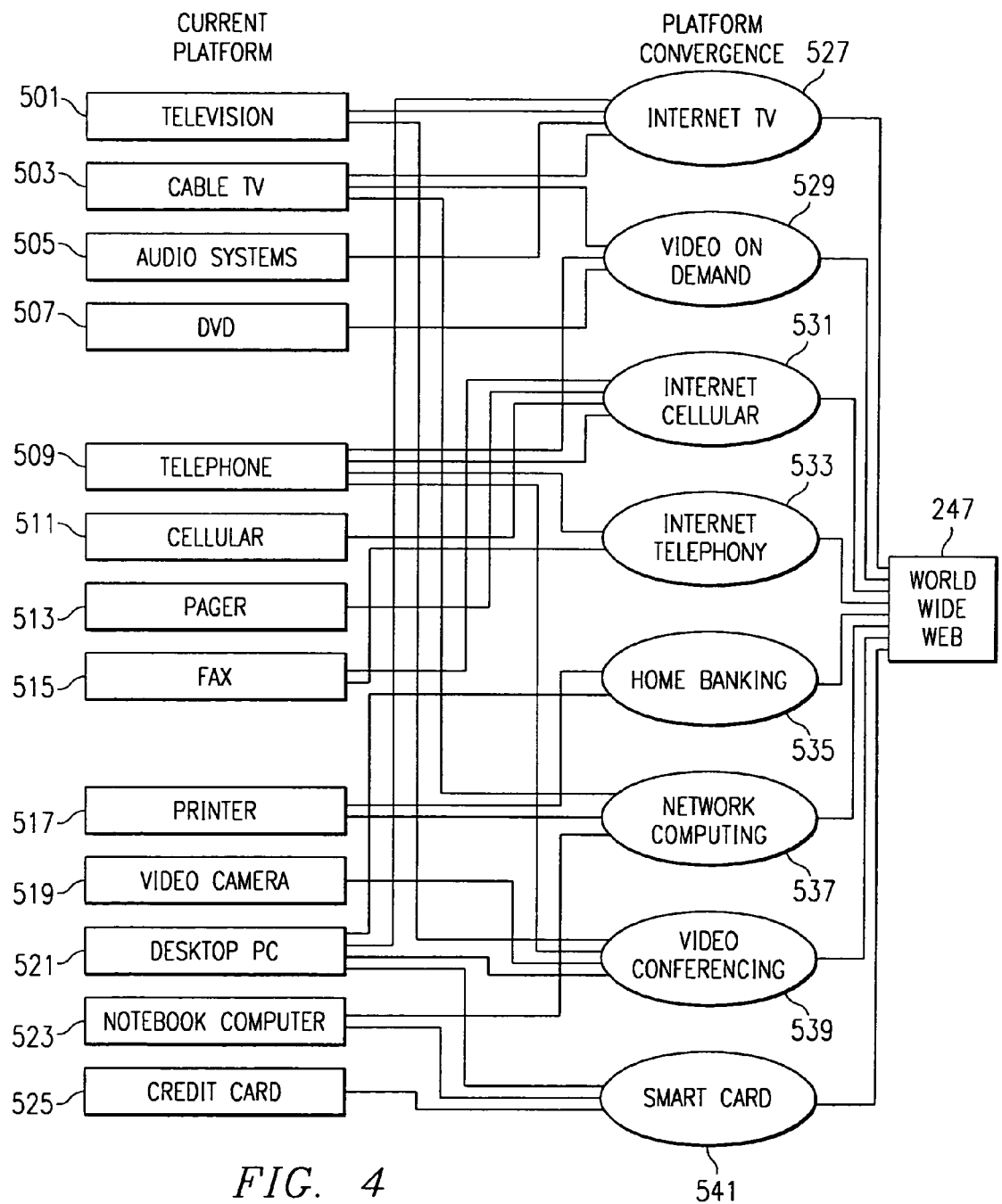
FIG. 4 is a block diagram representation of anticipated platform convergence and this view is utilized to discuss the types of digital content that will be available to the end users.

FIG. 4 is a simplified schematic representation of the convergence between communication and end devices which is currently occurring at least in first world economies. The aggregated content 263 under the direct or indirect control of service provider 249 may include one or more of these types of content and/or communication systems. This figure is useful in understanding the types of end devices within residence 201 which may be utilized by user 203 to access particular portions of aggregated content 263 or to engage in internet moderated commerce with affiliated providers of goods and services. As is shown, a number of current platforms are converging which relate to audio and video content. More particularly, the current platforms of television 501, cable TV 503, audio systems 505, and DVD (digital versatile disks) 507 are converging into two convergence platforms, namely internet television 527 and video on demand 529. Certain basic and current communication technologies are also converging. More particularly, telephone systems 509, cellular phone systems 511, pager systems 513 and facsimile systems 517 are converging into internet cellular platform 531 and internet telephony platform 533. A variety of other current platforms are also converging which are less pertinent in the present instance, but which merit attention. For example, current platforms of printer 517, video camera 519, desk top PC 521, notebook computer 523, and even credit card 525 are converging into home banking platform 535, network computing platform 537, video conferencing platform 539, and smart card platform 541. All of these convergent platforms 527, 529, 531, 533, 535, 537, 539, 541 will eventually be made available over the World Wide Web 247 or alternative wide area networks or local area networks. The current and preferred embodiment of the present invention contemplates the utilization of some aggregated content and some aggregated services, but as platform convergence accelerates a greater number and different types of functionalities may be integrated and provided to user 203 in residence 201 utilizing service provider 249.

Figure 5:
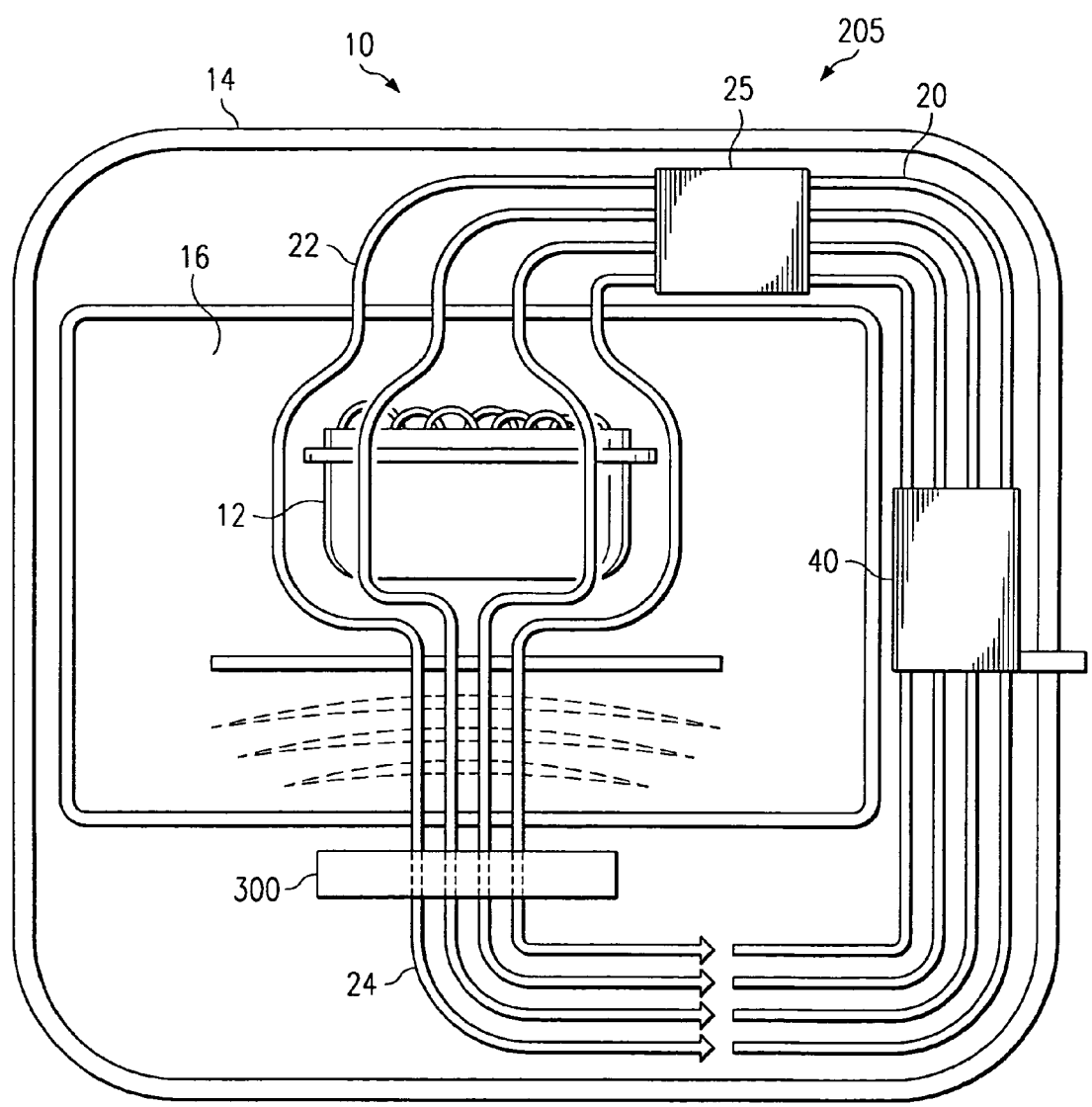
FIG. 5 is a highly simplified schematic representation of one preferred instance of the quick cook oven.

FIG. 5 is a simplified pictorial representation of a quick cooking oven 205, with this illustration being utilized to discuss the primary cooking functions performed by oven 205. As is shown, a cooking chamber 16 is defined within oven housing 14. A food item 12 is placed within cooking chamber 16. Electromagnetic energy is supplied preferably through actuation of microwave magnetrons. A conduit means 20 is provided to allow the entrainment of a heated air stream. An ingress conduit 22 is provided preferably at an upper portion of cooking chamber 16. A thermal energy source 25 heats the air which is pulled by blower 40 and recirculated through conduit means 20. A catalytic converter filter 300 is provided in the conduit means 20 to cleanse the air in order to eliminate or minimize food odors or oily particulate matter which can cross-contaminate food products if there are multiple types of foods being cooked at the same time. The mechanical details which make up the microwave cooking and impingement cooking mechanisms will be discussed in greater detail below.

Figure 6:
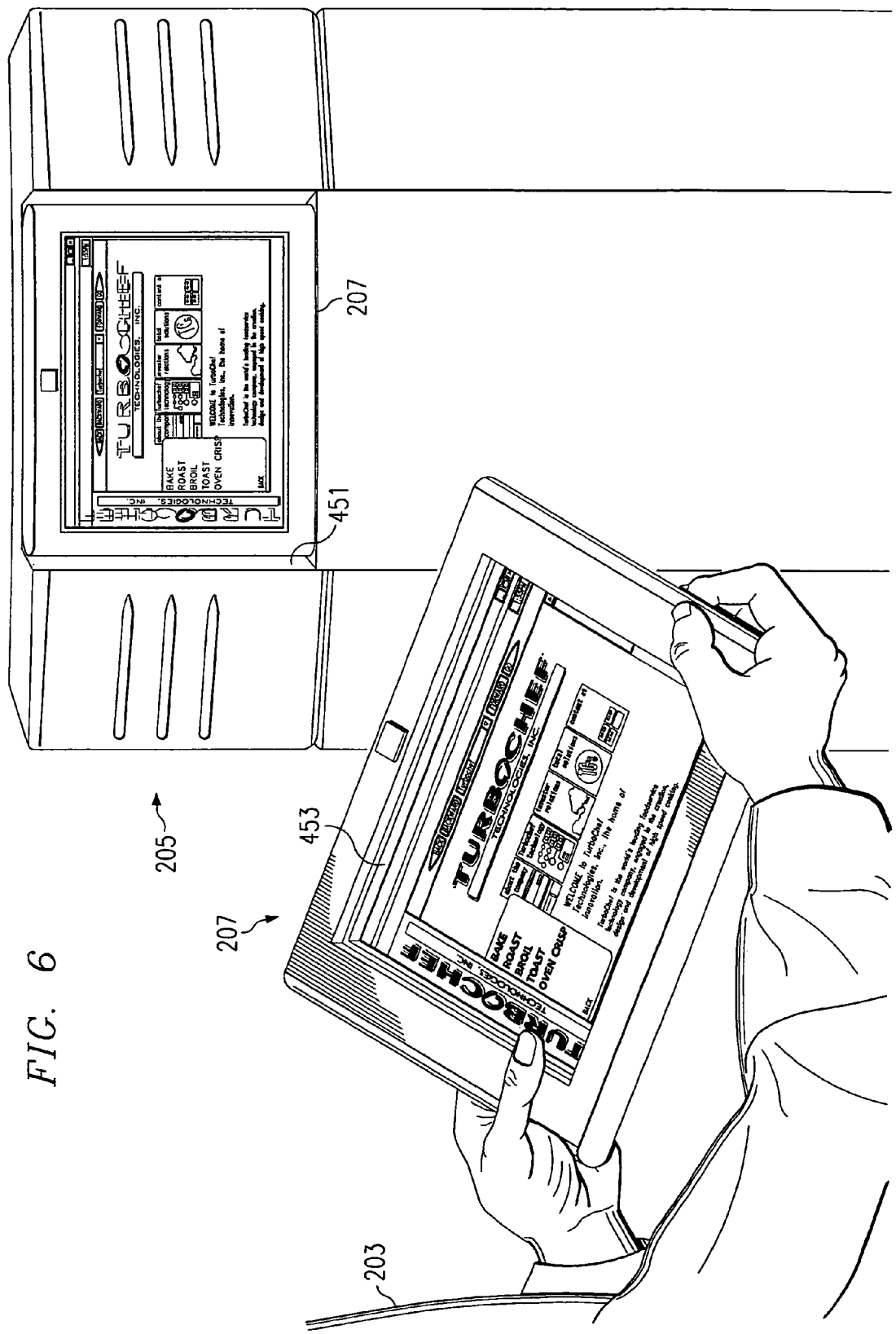
FIG. 6 is a pictorial representation of one embodiment of the quick cook oven of the present invention with two wireless user appliances, one depicted in a "cradled" mode of operation and the other depicted in an "uncradled" mode of operation.

FIG. 6 depicts in pictorial form the present invention which includes a wireless communication appliance 207 in a "docked" position within quick cooking oven 205, with an additional wireless communication appliance 207 shown in an "undocked" position and held in the hand of user 203. In this view, wireless communication appliance is shown in an enlarged form to allow depiction of the graphical user interface. As is shown, preferably a generally rectangular recessed area 451 is provided in a generally upper and outer location relative to the housing which forms quick cooking oven 205. This places the wireless communication appliance in a position which can easily be viewed while the wireless communication appliance 207 is "docked" in the recessed area. A plurality of releasable electrical connections are provided in recessed area 451 in order to continuously supply power and communication connections to wireless communication appliance 207 while it is "docked" within quick cooking oven 205. As is shown, the preferred wireless communication appliance 207 is generally rectangular in shape, having a size which is approximately that of less than the size of a book or 8½"×11" page. This provides a relatively large display area 453 which may include rich content including multicolored text and image portions, and which may include "active" regions and "passive" regions within the screen which allow the operator to utilize a touch sensitive screen in order to communicate through wireless communication appliance 207 in order to provide commands to quick cooking oven 205, or to communicate with other appliances within the residence 201 or with service provider 249 through the bi-directional communication channel 245 and WWW/LAN/WAN 247 (of FIG. 1A).

Figure 7:
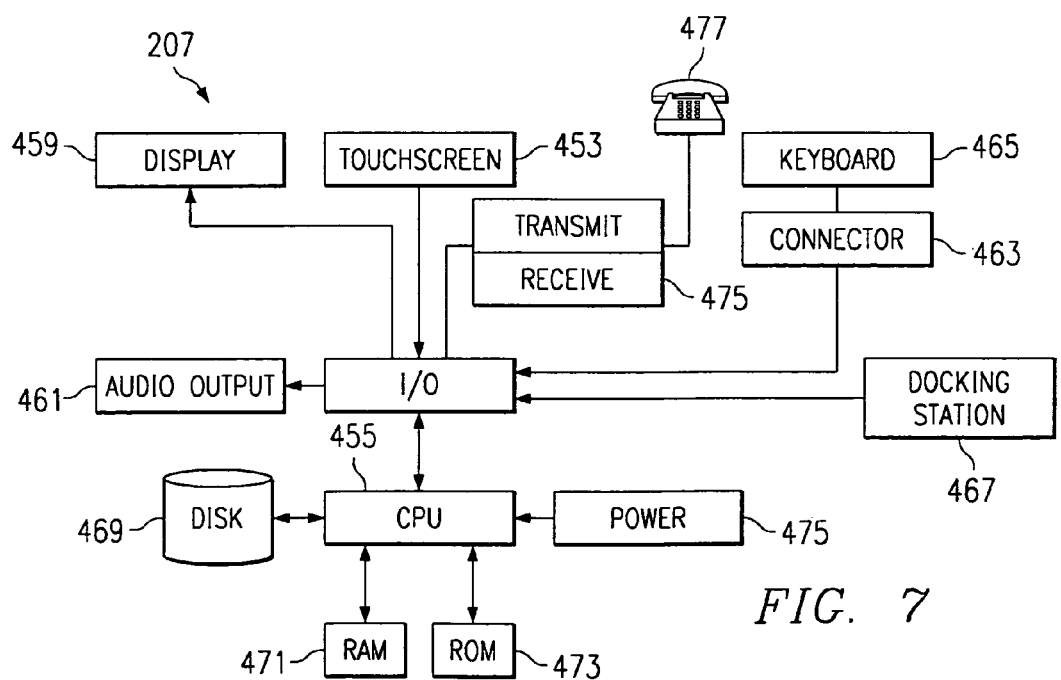
FIG. 7 is a block diagram representation of the operational components of the wireless user appliance, in accordance with the preferred embodiment of the present invention.

FIG. 7 is a simplified block diagram representation of the operating components of wireless communication appliance 207 of FIGS. 1B and 6. As is shown, a central processing unit 455 is provided which communicates through an input/output interface 457 to a plurality of passive and active subsystems. CPU may communicate with touch screen 453 in order to receive command inputs through user interaction with touch screen 453. Alternatively, input/output interface 457 may be utilized to allow CPU 455 to drive display 459 by providing text and images to the display in a conventional manner. Alternatively, CPU 455 may be utilized to communicate through input/output interface 457 with audio output 461. This may be utilized to provide sound in combination with images displayed on display 459. Of course, input/output interface 457 releasably electrically connects to docking station 467 which is preferably resident in quick cooking oven 205. An alternative means of inputting data may be provided by keyboard 465 may communicate through connector 463 with input/output interface 457 to allow the keying of text. CPU 455 communicates with transmitter 475 through input/output assembly 457 to allow antennae 477 to be energized to communicate wireless messages from the wireless communication appliance 207 to an associated receiver unit which may be connected to or resident in either or all of oven 205, gateway 221, and/or home PC 225 (all of FIG. 1B) and/or to receive incoming messages.

CPU 209 has associated with it RAM memory 471, RAM memory 473 and disk memory 469, all of which allow the CPU 209 to store and execute program instructions, as well as to store data. A power source is provided to provide power to CPU 455 and all other power consuming components of wireless communication appliance 207.

Figure 8:
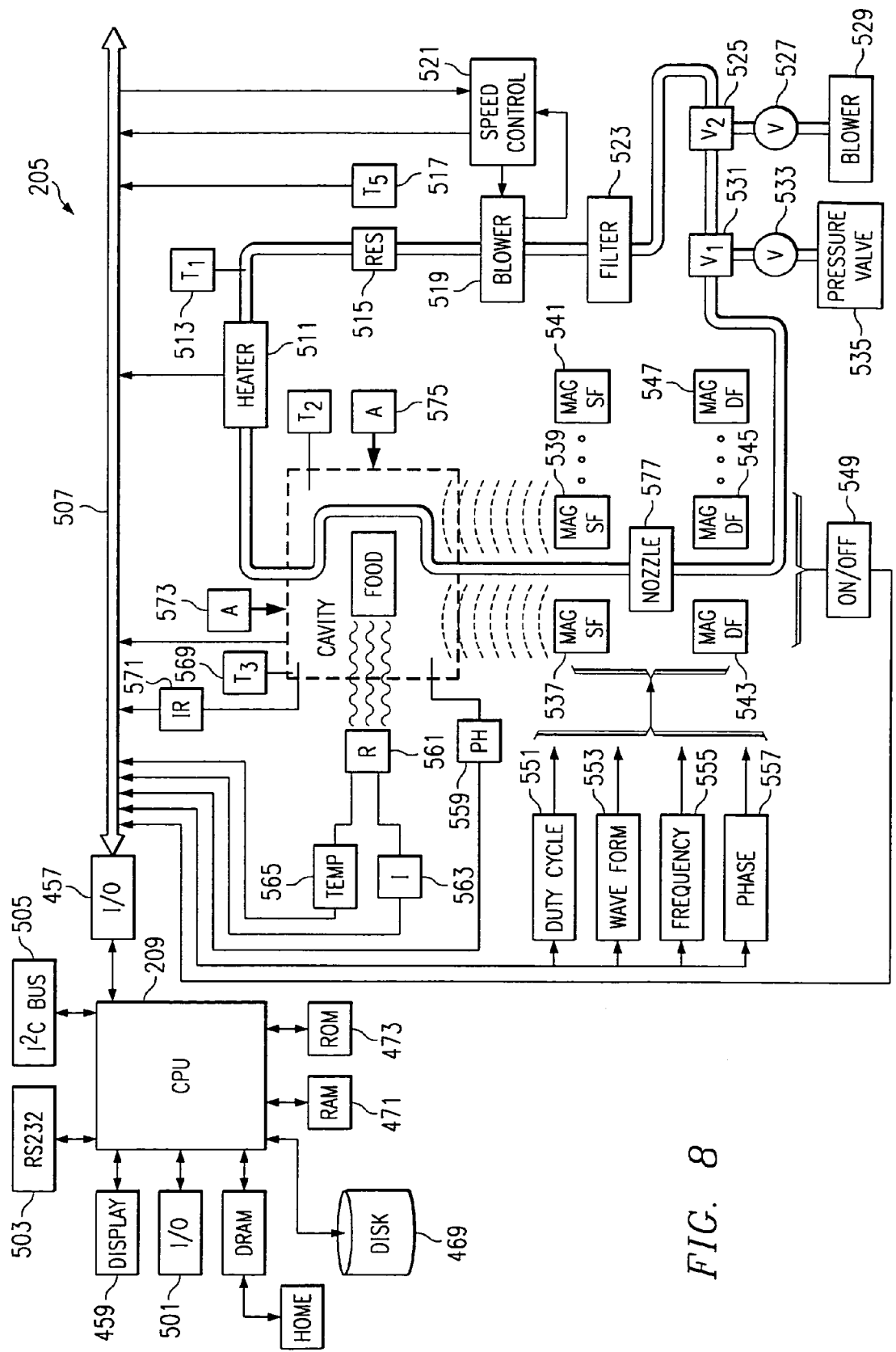
FIG. 8 is a block diagram representation of the central processing unit and controllable subsystems of the preferred quick cook oven of the present invention.

FIG. 8 is a block diagram schematic representation of a number of controllable subsystems within quick cook oven 205. As is shown, CPU 209 of quick cook oven 205 is communicatively coupled to RAM 471, ROM 473, and disk 469. CPU 209 drives display 259, and utilizes input/output bus 501 for communication. Additionally, an RS 232 port 503 is provided and an $I^2$ C BUS 505 is provided to allow connection to additional devices. As is shown in the view of FIG. 8, input/output interface 475 is connected to data bus 507. A plurality of controllable subsystems communicate with bus 507. Heater 511 is provided to heat the entrained air within the oven to maintain it at a particular temperature. A temperature sensor 513 is adapted for monitoring the temperature of the heated air which is entrained within the conduits. A reservoir 515 may be provided to provide preheated air to accelerate the start up interval associated with the oven. A temperature sensor 517 may be provided to monitor the temperature within the thermal reservoir. A thermal reservoir is an optional item and it may or may not be included in a particular oven. Blower 519 is provided for entraining the heated air. Speed controller is utilized to control the operation of blower 519 and maintain it at a predetermined speed or speeds. Catalytic converter filter 523 is provided in the airflow pathway and adapted to cleanse the air. Air may be exhausted from the conduit or supplied from ambient air to the conduit as is now described. Valves 525, 527 may be utilized in combination with blower 529 to introduce ambient air into the conduit, thus altering the temperature of the cooking air. Alternatively, hot air may be vented from the conduit through valves 531, 533 and pressure valve 535.

Electromagnetic radiation may be supplied to the oven cavity utilizing particular magnetrons or combinations of magnetrons. A plurality of single frequency magnetrons 537, 539, 541 may be provided which may be selectively energized in order to supply a predetermined amount of electromagnetic radiation into the cooking cavity. Alternatively, differential frequency magnetrons 543, 545, 547 may be alternatively utilized in order to energize the food with electromagnetic radiation at two particular frequencies of operation. Any combination of frequencies may be utilized, so any combination of magnetrons may be utilized. An on/off detection system 549 is utilized to provide feedback to CPU 209 about the operating condition of the selected magnetrons.

The magnetrons may be moderated in their operation through alteration of the duty cycle, waveform, frequency, and phase. To that end, a duty cycle adjustment circuit 551 is provided in order to alter the duty cycle of energies applied to any particular one or combinations of magnetrons. Alternatively, a waveform modifier circuit 553 may be provided in order to alter the waveform of the energy being supplied to any one or particular combinations of the magnetrons. For example, the sinusoidal power supply may be converted to a sawtooth waveform or a square waveform. This may have an impact on the cooking process. Alternatively, frequency adjustment circuit 555 may be utilized to modify the frequency of operation of the power supply to the magnetrons. Finally, phase may be modified using phase modification circuit 557 in order to alter the phase of the power supply to one or more of the magnetrons in order to modify the electromagnetic portion of the cooking operation.

It may be possible to utilize the present quick cook oven in combination with the radiant heating element 561. Current supply 563 supplies energy to the radiant cooking element and temperature sensor 565 provides an indication of the key of the radiant element. A resistive heating element 539 may be supplied in order to provide an indication of heat within the cooking chamber. Additionally, the temperature of the surface of the food may be monitored utilizing an infrared sensor 571 or through direct monitoring utilizing a temperature probe 569. The size of the cooking chamber may also be modified using mechanical actuators 573, 575 in order to reduce or enlarge the cavity size. Additionally, adjustable nozzle assembly 577 may be adjusted in order to vary the number, size, and/or orientation of air flow nozzles in order to direct the airflow around the food item. In accordance with the preferred embodiment of the present invention, one or any combination of computer controllable variables may be established when a new cook setting is supplied to an oven.

Referring now to the drawings, and in particular to FIGS. 9–15A, 15, and 15C thereof, therein illustrated is one embodiment of a hybrid oven according to the present invention, generally designated by the reference numeral 10, for cooking a food product 12 (see FIG. 12) by both hot airflow and/or microwave cooking; this oven is much simpler than the oven which is depicted in FIG. 8. The terms "air" and "airflow" are used interchangeably with "gas" and "gas flow" in this description unless otherwise noted. The oven 10 essentially comprises a housing generally designated 14, a cooking chamber generally designated 16 which is adapted to receive a food product 12 for cooking, and conduit means generally designated 20 for selectively providing gaseous communication external to said cooking chamber 16, between the bottom and top of the cooking chamber 16. More particularly, the gaseous communication, or conduit means, 20 includes both an ingress conduit 22 (typically, but not necessarily, disposed adjacent the top of the cooking chamber 16) for the ingress passage of hot pre-cooking air into the cooking chamber 16, and an egress conduit 24 (typically, but not necessarily, disposed adjacent the bottom of the cooking chamber 16) for the egress passage of cooler post-cooking air from the cooking chamber 16. The airflow passes through a blower 40 to be discussed hereinafter, and may also pass through purification means 300.

It will be appreciated that the conduit means 20 also serves as a plenum of limited volume in that it contains (on an instantaneous basis) a small volume of air, typically hot air when the oven is in use. The "effective" plenum formed by the conduit means 20 is of substantially reduced volume relative to the plenum/reservoir described in the aforementioned TurboChef Patents. Thus, in the preferred embodiment of the present invention the cooking chamber 16 has a free or unoccupied volume for air of approximately 1600 cubic inches, and the conduit means 20 (from one end to the other) has a free or unoccupied volume for air of approximately 1100 cubic inches. Accordingly, in the present invention the free volume for air ratio of the conduit means to the cooking chamber is preferably less than 1, and optimally about 0.68. (By way of contrast, the TurboChef Patents teach a free volume for air ratio of the conduit means (plenum/reservoir) to the cooking chamber greater than 1, and preferably about 1.5.)

The conduit means 20 has associated therewith and, as illustrated, preferably, but not necessarily, disposed therein, a thermal energy source 25 for heating "on the fly" the air disposed in the conduit means 20. The thermal energy source 25 is preferably a plurality of heating element 25a such as a series of parallel heating coils 25a (six coils being illustrated in FIG. 10), the number and power consumption of the coils being selected so as to be capable of providing the desired heating of the air passing through the conduit means 20 for entry into the cooking chamber 16. Preferably the heating means 25 is provided adjacent the top of the cooking chamber 16, but in or upstream of ingress conduit 22 leading into the cooking chamber 16.

A preferred thermal energy source 25 comprises a six-pass coiled wire having a wire diameter of 0.06 inch and constructed as an open-coil element made of nickel-chromium (Ni—Cr) resistance heating wire currently available from TutCo of Tennessee. During oven operation, the thermal energy source 25 operates at a temperature between 77 degrees Fahrenheit and 1800 degrees Fahrenheit. At 240 volts AC power input, the total input power to the elements is about 6,000 watts. Maximum airflow across the thermal energy source 25 is about 3,000 cubic feet per minute.

While conventional wall outlets in U.S. residences provide about a 105–120 volt, single phase power supply, there are frequently dedicated outlets (such as required for a clothes dryer, wall oven, cooking range, or the like) which provide a 200–240 volt power supply, depending on the customary voltage of a particular country. Various countries operate with various power supplies, and the oven herein described is adaptable to such various power supplies. The oven 10 is capable of operating on a 200–240 volt power supply at 40 amperes or less, preferably at 30 amps or less. The energy output from the thermal energy source 25 is capable of meeting the thermal demand of the oven so that the temperature of the air entering the cooking chamber 16 may be maintained substantially constant at a pre-set level.

It will be appreciated that in the present oven one may vary not only the cooking time, and the microwave output level, but also the hot-air temperature (within limits) by controlling, over time, the power being introduced into the system for the generation of thermal energy. (By way of contrast, in the TurboChef Patents a hot air plenum/reservoir contained a high thermal mass heat exchanger which heated the airflow, thereby producing a hot-air temperature which was substantially fixed under normal conditions.)

As will be discussed hereinbelow, in certain instances the user of the oven 10 will be able to set the hot air temperature for a particular cooking cycle and, accordingly, means are provided to increase or decrease the temperature of the hot air entering the cooking chamber 16 so as to approximately match the cooking temperature pre-set by the user. This may be accomplished either by cycling the thermal energy source 25 on and off, or by maintaining the thermal energy source 25 on, but varying the power input thereto. The ability of the oven of the present invention to heat the air "on the fly"—without use of a separate, dedicated plenum/reservoir containing a large thermal mass (to absorb heat from a power source between cooks and to facilitate rapid heat transfer between the reservoir and the air within the plenum during cooks, as taught in the TurboChef Patents)—is a major factor in enabling the desired reduction in size of the present oven compared to the conventional commercial quick-cooking oven. For example, the thermal energy source 25 may be provided with an appropriate thermal heat source and a closely spaced series of thin fins, plates running parallel to each other, or tubular calrod elements. The thermal energy source is preferably disposed so as to maximize heat transfer to the air passing through the conduit means 20 while at the same time minimizing interference with the movement of air thereover. For example, the thermal energy source, when electrically energized over a short period of time, is capable of bringing the air within the conduit means 20 and the cooking chamber 16 (as well as the adjacent walls of the conduit means 20 and cooking chamber 16) to the desired operating temperature.

Operation of the thermal energy source 25 may be controlled by the control means 250 to be discussed hereinafter, including a thermostat and a cut-off switch which cuts off power to the thermal energy source 25 under at least two conditions. In the first condition, the power supply is being used for the magnetron or hot air blower, and there is insufficient power to enable the magnetron 100, hot air blower motor 40a and heating means 25 to be simultaneously operated. In the second condition, either the actual temperature of the thermal energy source 25 or the actual temperature of the air entering the cooking chamber 16 exceeds a "set" temperature. To this end, the thermal energy source 25 and the entry to the cooking chamber 16 are preferably provided with separate temperature-sensing mechanisms 30 and 30' (such as a thermocouple or resistive thermal device) positioned so as to measure the temperature of the air at these critical points.

A hot air blower assembly 40 is provided to circulate the air in the substantially closed air system defined by the cooking chamber 16 and the conduit means 20, while also providing the desired hot airflow onto the food product 12. The blower assembly 40 typically includes a blower motor 40a, a blower wheel 40b within a blower housing 40c and a drive belt 40d connecting the blower motor 40a to the blower wheel 40b. While a blower assembly 40 which has the blower wheel directly secured to the blower motor (that is, without a drive belt therebetween) may be used, the type of blower utilizing a drive belt is preferred because it allows for relocation of the blower components so as to accommodate the limited available space within the oven housing. While a variable-speed blower (and more particularly a variable-speed blower motor) is preferred, a fixed-speed blower (that is, a fixed-speed blower motor) may be used, with the blower motor being cycled on and off as necessary to provide the desired thermal energy for the cooking chamber. If desired, the conduit means 20 may be provided with dampers or louvers in order to modify the volumetric air flow through the conduit means 20 and thereby obtain the effect of a variable-speed blower while employing a fixed-speed blower.

The blower assembly 40 takes the spent or relatively cool hot air from the cooking chamber 16 via the egress conduit 24 and forces it through conduit means 20 for re-heating and re-circulation into the cooking chamber 16 via the ingress conduit 22. (As a safety precaution, the blower motor 40a is automatically deactivated when the oven door 80 to the cooking chamber 16 is open, thus precluding both accidents and the unintentional escape of heat from the oven through the cooking chamber door opening 16a.) The hot air passing through the ingress conduit 22 is made to flow against at least one surface of the food product 12 in the cooking chamber 16, as described hereinbelow.

Preferably a hot-air impingement technique is used wherein the hot air leaving the ingress conduit 22 passes through an inlet plate 55 having generally vertically disposed apertures 56 therethrough. The apertures 56 direct columnated flows of hot air downwardly into the cooking chamber 16, closely adjacent the upper surface 12a of the food product 12 therein. The columnated flows of hot air not only contribute to cooking of the food product upper surface 12a, but further act to sweep away the boundary layer of air at the food product upper surface 12a.

The production of columnated airflows directed for impingement upon a food product may be generated by conventional impingement tubes, by an inlet plate (as illustrated herein), or by like means. The principles of operation of hot-air impingement cooking are well known in the art and hence need not be described herein in detail. It will be appreciated by those skilled in the cooking art that other means for causing hot air to impinge upon the food product 12 in the cooking chamber 16 may be used. For example, a cyclone blower (not shown) may be used to create a cyclonic vortex within the cooking chamber cavity. As long as the food product is spaced above the cooking chamber bottom (e.g., the disk 110)—for example, by upstanding ribs—the cyclonic vortex will itself efficiently cook both the top and bottom surfaces of the food product 12 simultaneously. In this manner, a modified "shroud" effect is obtained without using an apertured platter for supporting the food product and for forcing the hot airflow over the food product bottom 12b by limiting the egress of the airflow. The upstanding ribs are preferably designed so as to maximize hot airflow intermediate the disk 110 and the food product bottom 12b.

Preferably the cyclonic air enters from a side of the cooking chamber 16 rather than the top or bottom thereof. The food product side adjacent the entry point of the cyclonic hot airflow is clearly cooked, but the opposite side (that is, the food product side remote from the entry point of the hot airflow) typically receives a somewhat lesser cook from the hot airflow.

A cyclonic vortex hot airflow system enables a more compact oven design (especially a shorter oven) and improved baking performance. While an air impingement system is suitable for many products, it is not the preferred method for baking products such as cakes, pies, and the like, as it tends to cook the delicate surface of the product too quickly, thereby creating surface ripples or creating a dot-like surface browning. Additionally, the air impingement geometry tends to increase the height of the oven for a given cooking chamber cavity size in order to accommodate the air ducts or conduits needed to produce the air impingement flow.

Thus, in order to create a more compact oven geometry and a better airflow pattern for preparing bakery products, a cyclonic vortex system is preferred wherein a very random swirling airflow pattern is created within the cavity that scrubs (rather than impinges upon) the surface of the food product. The random nature of the cyclonic vortex is required to insure that all surfaces of the food product experience the same time average set of heat transfer conditions.

The cyclonic vortex is developed by imparting a large swirl element to the hot airflow, the swirl action creating vortices within the cavity that tend to randomize airflow. The cyclonic vortex may be created by (a) a radial inflow of hot air into the cavity, horizontally aligned with the food product and adjacent the bottom of the cavity, with means of inducing the hot airflow around the food product and then out of the cavity, (b) a downward swirling hot airflow over the food product produced by fixed nuggets on the cooking chamber sidewall or (c) a downward swirling hot airflow produced by a blower wheel located over the food product so as to both cause the re-circulation of the hot airflow and the desired swirl of the hot airflow within the cavity. In this latter case, if desired, the thermal energy source may be disposed about the re-circulating blower. It will be appreciated that where the cyclonic vortex is utilized in connection with ribs for supporting the food product bottom above the cooking chamber bottom so as to define an airflow passage therebetween, as earlier indicated the apertured platter is not necessary in order to insure conductive cooking of the food product bottom surface.

While the inlet to the egress conduit 24 has been illustrated as centrally vertically aligned within the cooking chamber 16 (that is, along a central vertical axis thereof), in point of fact the inlet to the egress conduit 24 may be substantially horizontally offset therefrom. In this case, the air which passes through the platter 64 undergoes a change in flow direction above the basket 84 such that the downwardly directed air stream may enter the inlet of conduit 20 via the screen 82. Placement of the entrance to egress conduit 24 at a point horizontally displaced from the central vertical axis extending through the cooking chamber 16 and the launcher 106 (26) has the advantage of minimizing any harmful influence of one system (for example, the microwave or hot air system) on the other system (for example, the hot air or microwave system). Indeed, in a cyclonic vortex oven the entrance to the egress conduit 24 may be disposed not underneath the cooking chamber bottom at all, but rather in the surrounding cooking chamber sidewall at an appropriate height above the cooking chamber bottom.

It will be appreciated that, in order to provide a vertically more compact oven, the oven of the present invention does not employ the "diffuser" taught by the TurboChef Patents.

A refractory platter 64 of microwave-transparent and heat-resistant material (such as a metal oxide or ceramic) defines a plurality of upwardly extending bosses 67. The platter 64 is supported by a platter support (not shown) which may extend inwardly from the oven door 80 and acts as a food support. The main body of the refractory platter (excluding the bosses 67) is disposed in close but spaced relationship to the bottom surface 12b of the food product 12 (illustrated in phantom line in FIG. 12), which is supported on bosses 67. Intermediate the bosses 67, the main body of the platter 64 defines a pattern of apertures 66 therethrough so as to enable the spent, relatively cool air to leave the cooking chamber 16 adjacent the bottom thereof. As the platter 64 preferably extends essentially the full diameter of the horizontal plane of the cooking chamber 16 in which it is disposed, the apertures 66 thereof constitute the only passages through which the spent air can escape the cooking chamber 16 and pass back into the conduit means 20. The exact diameter of each aperture 66 is determined by experiment with the intention of uniformly distributing the air flow from the inlet plate 55 through the various apertures 66.

In particular, the cooking chamber 16 is substantially air-tight (when the door of the oven is closed) so that substantially all of the air passing from the ingress conduit 22, through the air inlet plate 55, and onto at least a first surface 12a of the food product 12 (here, the top surface), reaches the egress conduit 24 only after at least a portion thereof passes across the remaining portion of the first surface 12a, and across a substantial portion of a second surface 12b of the food product 12 (here, the bottom surface) opposed to the first surface 12a. Thus, as illustrated, most of the air from the food product top surface 12a is forced to pass over the food product sides, and at least a portion thereof is forced to pass over the entire radius (or a substantial portion thereof) of the food product bottom surface 12b before the air reaches the egress conduit 24. To this end, the apertures 66 of the platter 64 are sized to restrict the amount of hot air that can pass downwardly through each aperture so that, before exiting, the cooking chamber hot air passes over a substantial portion of the food product bottom surface 12b before it can emerge on the bottom side of the platter 64.

Figure 12:
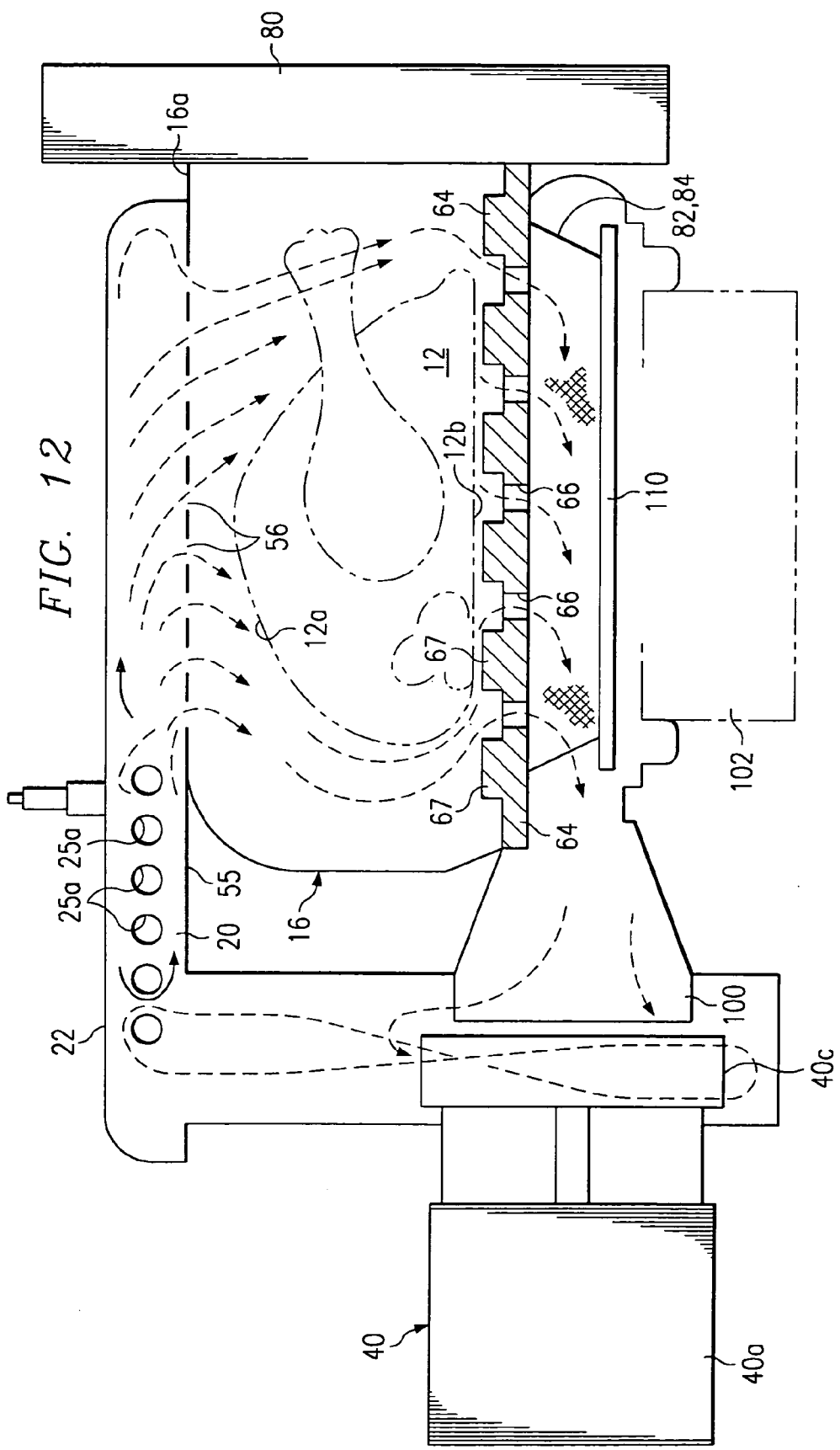
FIG. 12 is a sectional view thereof taken along the line 4—4 of FIG. 9.
Figure 13:
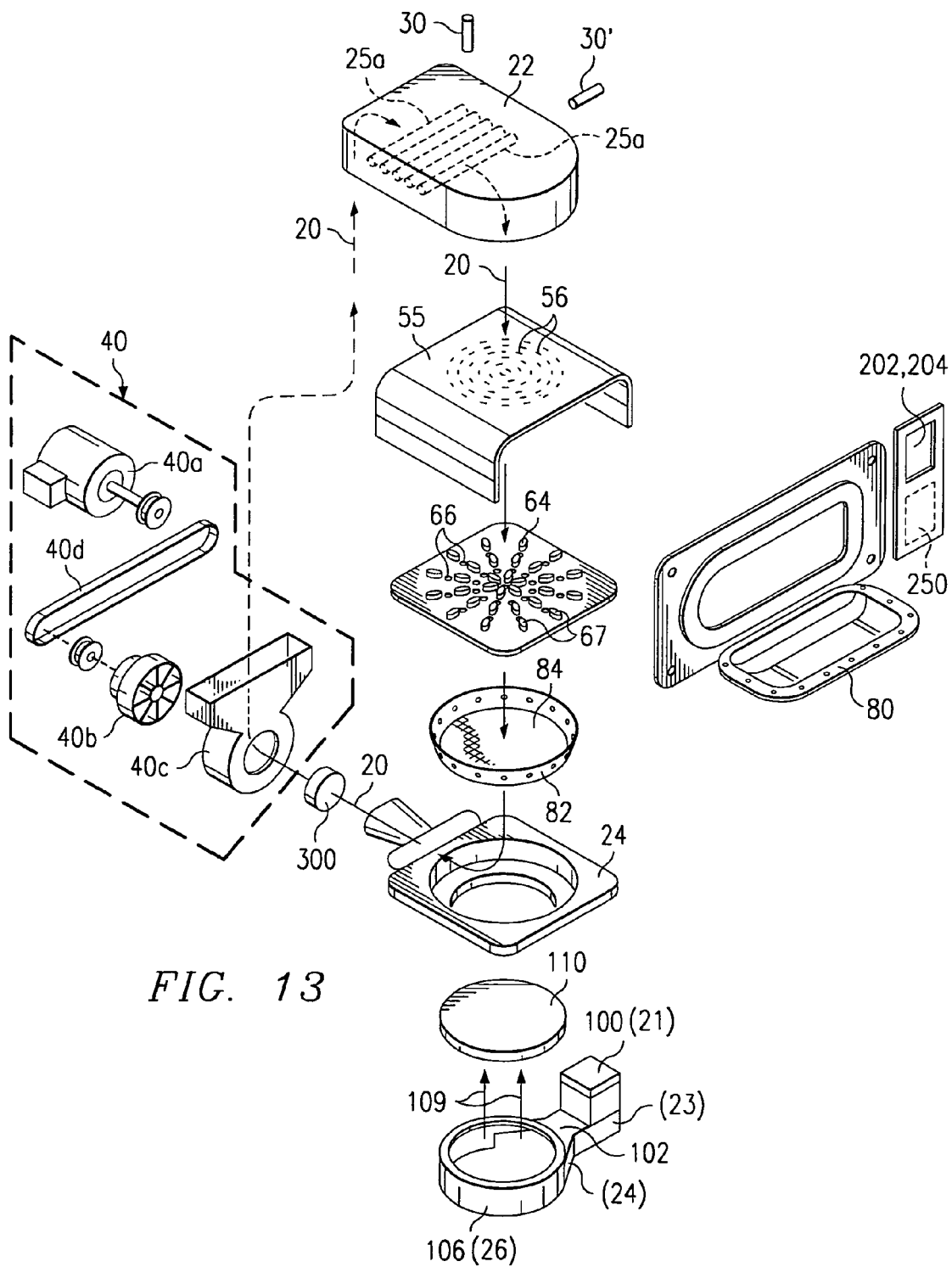
FIG. 13 is an exploded isometric view of the basic components thereof.

More particularly, the hot air leaving the inlet plate apertures 56 strikes the food product upper surface 12a in areas more or less aligned with the air inlet apertures 56. Most of the hot air which contacts the areas of the food product 12 aligned with the apertures 56 is drawn radially outwardly across the upper surface 12a of the food product and downwardly around the sides of the food product so that the hot air passes over the areas of the food product upper surface 12a which are not aligned with the apertures 56. The still-hot air traveling radially outwardly over the non-aligned areas is in heat-transfer relationship with such non-aligned areas so that a generally uniform cooking of the entire food product upper surface 12a is achieved without any relative movement of the apertures 56 or the food product 12. (See broken line arrows of FIG. 12 representing the hot airflow about the turkey-like food product 12.) The upper surface of the platter 64 intercepts the still-hot air (at least some of which has passed over the top surface 12a and sides of the food product 12) and prevents it from leaving the cooking chamber 16 until at least a substantial portion of the still-hot air has passed radially inwardly, intermediate the food product bottom surface 12b and the upper surface of the platter 64 in heat-transfer relationship with the food product bottom surface 12b. During its passage along the food product bottom surface 12b, the hot air is cooking the food bottom surface 12b, thus providing enhanced cooking thereof. The now relatively-cool "hot air" passes through the apertures 66 of the platter 64 and departs from the cooking chamber 16.

The exact fraction of the entering hot air which passes along various portions of the food product bottom surface 12b before reaching an available platter aperture 66 which is capable of accommodating it (that is, an aperture 66 which is not already at its full air-flow capacity) will be determined by a number of design features of the oven (and thus set by the manufacturer) as well as a number of operational features (and thus set by the user). As an example of the design features, the appropriate spacing between the food product bottom surface 12b and the upper surface of the platter 64 is selected so as to achieve maximum cooking of the food bottom surface 12b without unduly limiting the flow of air through the oven. Preferably the height of the bosses 67 is small so that the velocity is relatively high and therefore sweeps away the boundary layer about the food product bottom surface 12b (much as the impinging air sweeps away the boundary layer of the food product upper surface 12a). To maximize heat transfer to the food bottom surface, the height of the bosses 67 should be as low as possible without restricting airflow. Conversely, to reduce heat transfer to the food bottom surface 12b, the height of the bosses 67 should be increased to bring less of the hot air stream into contact with the food product bottom surface 12b (due to more volume between the top of the platter 64 and the bottom of the food surface 12b). Other design features would include the size and spacing of the platter apertures 66.

User-determined features affecting the air flow include the configuration and dimensions of the food product or products 12 placed on the bosses 67 of platter 64, and the degree to which the food product(s) substantially cover the platter apertures 66. Ideally, in the absence of any food product 12 in the cooking chamber 16, most of the air passing downwardly from the ingress conduit 22 via the plate apertures 56 passes more-or-less directly through the platter apertures 66 with only minor directional deviations, such that the platter 64 does not represent a bottleneck for the airflow. In other words, the combined cross-sectional areas of the platter apertures 66 is just sufficient to accommodate the combined cross-sectional areas of the hot air jets leaving the inlet plate apertures 56. Because the individual platter apertures 66 not covered by a food product or products are substantially fully occupied by the air impacting on the same via a vertically aligned (or close to vertically aligned) air inlet aperture 56, the downwardly directed hot air stream impinging on the food product upper surface 12a, and then passing along the food product sides, will find available only the platter apertures 66 disposed below the food product(s). Accordingly, the "shroud" effect described in the TurboChef Patents—whereby the hot air initially impinging on selected areas of the food product is thereafter forced into and maintained in heat-transfer relationship with other areas of the food product so that the remaining heat value of the hot air is efficiently used to heat the other areas of the food product as well—is achieved by the platter 64 without forcing all of the airflow to pass radially inwardly until it can depart through a relatively large central aperture of the platter.

Before the air leaving the platter apertures 66 passes through the egress conduit 24 of conduit means 20, it is at least somewhat cleaned by passage through conventional filter means for cleaning the air stream of particulate matter and/or grease which may result from the handling or cooking of the food product 12 within the cooking chamber 16. A preferred filter means comprises a perforate basket 84 for collecting the large solid by-products of handling and cooking the food product 12, and a cylindrical mesh filter 82 secured to the periphery of the basket 84 for movement therewith as a unit, the filter 82 being disposed about and around the basket 84 for collecting the smaller solid by-products.

Those skilled in the oven art will readily appreciate that, where appropriate for the particular food products to be cooked, the entire operative configuration of the oven can be inverted so that the hot air inlet plate 55 is disposed below the food product 12, so as to directly force the hot air upwardly against the bottom surface 12b; and the platter 64 is disposed above the food product top surface 12a, so as to force the hot air to then flow to across a portion of the diameter of the food product top 12a.

Turning now to the microwave-cooking feature of the present invention, microwave ovens are well known in the art and hence need not be described in great detail herein. As described in McKee U.S. patent application Ser. No. 09/053,960 (using the reference numerals from that application in parentheses), a single magnetron 100 (21) is disposed so that the microwave output therefrom is discharged via a horizontal waveguide (23) into a quarter-wave matching waveguide (24), then directly into a vertically oriented circular launcher 106 (26). Because the height of the circular launcher 106 (26) of the present invention is thus decreased, the overall height of the microwave system is thereby reduced, resulting in a more compact residential oven. The circular launcher 106 radiates the microwave energy upwardly towards the platter 64 and the food product 12, as illustrated by the broken line arrows 109 of FIG. 13. The magnetron system is provided with a heat seal or barrier 110 so that the hot air from the cooking chamber 16 cannot enter the magnetron/waveguide system. The heat seal or barrier 110, is formed of a microwave-transparent and heat-resistant material, such as ceramic, quartz, or other suitable material.

In order to meet the very stringent space requirements of a residential oven, the magnetron and waveguide are preferably rotated from the horizontally facing orientation disclosed in McKee U.S. patent application Ser. No. 09/053,960 to a downwardly facing vertical orientation wherein the magnetron may be horizontally aligned with the circular waveguide, as disclosed in McKee et al. U.S. patent application Ser. No. 09/169,528. If desired, the microwave energy system may be inverted so that the microwave energy is projected downwardly, or divided, with a portion thereof being fed upwardly and a portion thereof being fed downwardly. Indeed, if desired, the microwave launcher 26 may launch the microwave energy at the food product from the sides thereof rather than, or in addition to, the bottom thereof, or the top thereof, or both.

An exothermic catalytic converter 300, similar to the one disclosed in McKee U.S. patent application Ser. No. 08/863,671, is preferably employed to remove airborne grease from the airflow. The removal of airborne grease and other hydrocarbons from the airflow by exothermic catalytic means helps to reduce the energy level requirements of the oven as the air passing over such catalytic converter 300 increases in temperature by, in some instances, as much as 250° F. Additional heating means (not shown) for the airflow may be provided upstream of the catalytic converter 300 to further ensure that the temperature of the airflow entering the catalytic converter is high enough to produce the desired catalytic reaction. Accordingly, such an auxiliary heater would typically be activated only intermittently.

In order to eliminate the need for a catalytic converter housing of substantial bulk within the confines of a residential oven, additional catalytic material may be disposed, in addition or alternatively, as a coating on the interior surface of the conduit means 20 or other interior oven surfaces, thereby to further increase exothermic catalytic activity. As interior coating of surfaces with exothermic catalytic material is known to those skilled in the art, further discussion and description thereof is not presented herein.

The pre-set temperature of the hot air (whether set by the user or by a generic cooking formula) tends to be in the range of 275 degrees Fahrenheit to 545 degrees Fahrenheit. The capacity of the thermal energy source 25 to increase the temperature of the air flow, thereby to meet the requirements of a pre-set temperature (determined either by the user for particular cooking formulas wherein the user has that option or by the system through its generic cooking formulas), is, for practical purposes, instantaneous. On the other hand, the ability of the oven to cause the airflow to rapidly drop its temperature simply through de-activation of the thermal energy source 25 is limited. This is an especially important consideration in a residential oven where the user is given the option for setting a pre-set temperature for a given cooking operation and a particularly low temperature is set immediately after a particularly high temperature operation. Accordingly, the rapid air temperature modification system disclosed in McKee, U.S. patent application Ser. No. 09/064,988 may be employed, as necessary, to reduce the temperature of the airflow entering the cooking chamber 16.

Preferably the control means 250 periodically actuates the blower assembly 40 to circulate air to preheat and then to maintain the cooking chamber 16 to at least a predetermined minimum temperature between cooking cycles. For example, during the preheat stage, or at fixed time intervals thereafter (say, of about a minute), or whenever the cooking chamber thermocouple 30' indicates that the cooking chamber 16 is below a predetermined minimum temperature, thermal energy source 25 and blower assembly 40 may be activated so that hot air from the conduit 20 brings the temperature of the cooking chamber 16 above the predetermined minimum temperature, thereby to ensure that the next food product 12 is, in effect, placed in a pre-heated cooking chamber 16.

Figure 9:
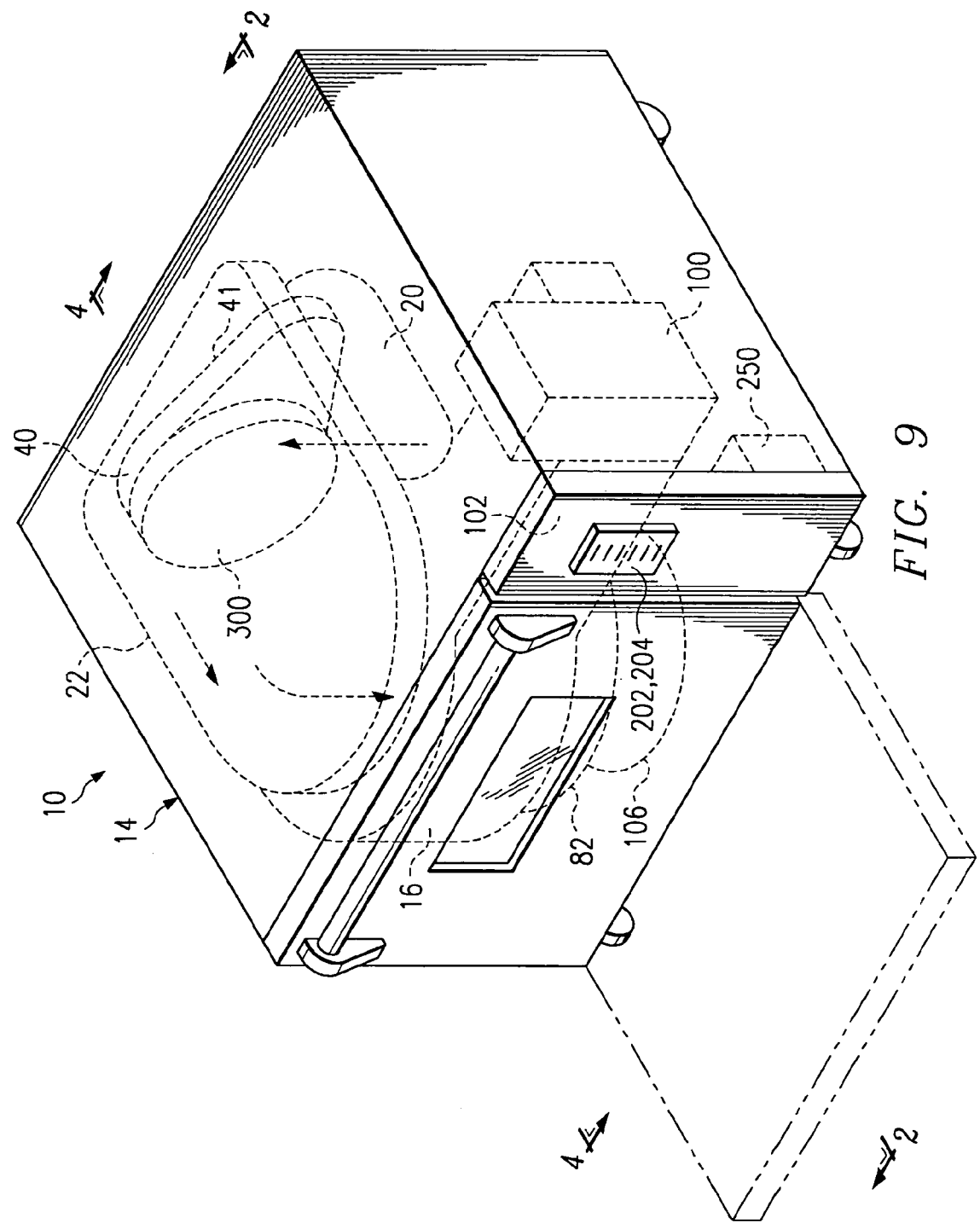
FIG. 9 is an isometric view of an oven according to the present invention.
Figure 10:
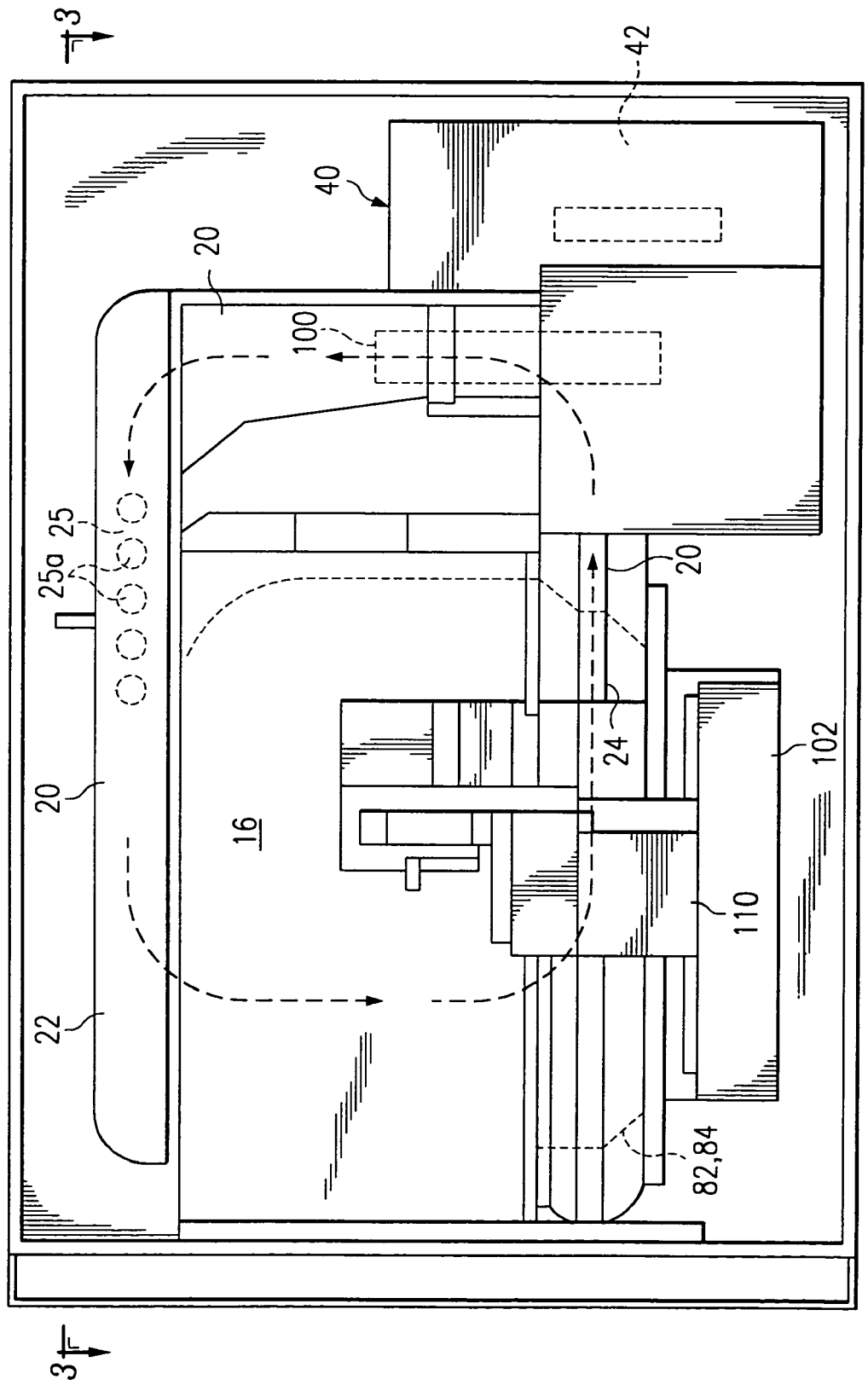
FIG. 10 is a sectional view thereof taken along the line 2—2 of FIG. 9.
Figure 11:
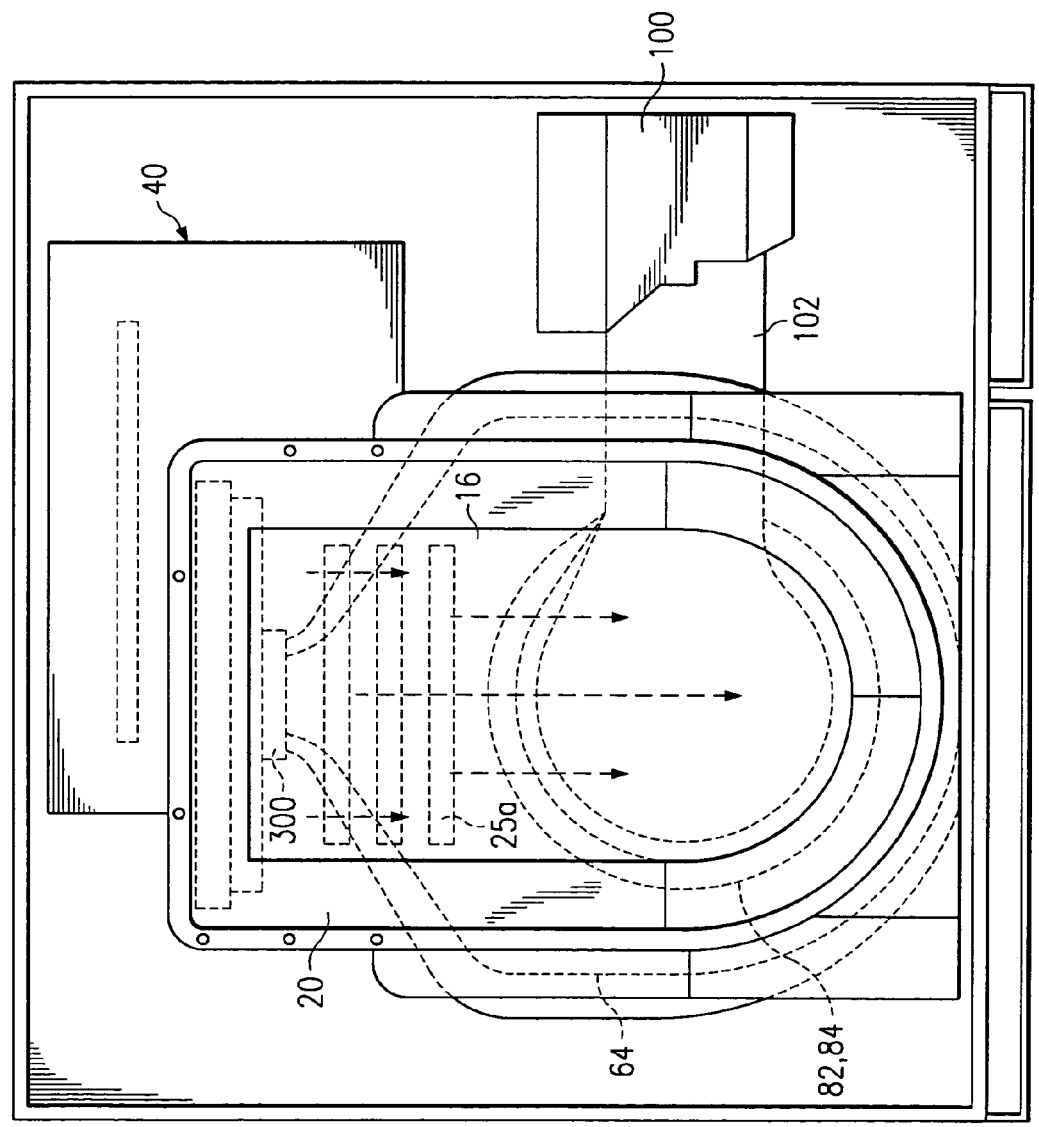
FIG. 11 is a sectional view thereof taken along the line 3—3 of FIG. 10.

Referring now to FIG. 9 in particular, therein illustrated is the oven front including a hinged door 80 for closing the cooking chamber opening 16a and a stationary control panel, generally designated 200, which includes a display 202 such as an LED panel, a data entry system 204 such as a touch-sensitive screen, and various optional switches. Control means 250 determines constant operation or cycling of a fixed-speed blower (or control of louvers and doors where these are used to control the air flow in a fixed-speed blower configuration), selected variation of a variable speed blower 40a when present, the thermal energy source 25, and the magnetron 100. The operator interface with the control means is similar to that used in the commercial ovens of the TurboChef Patents. In view of the wide range of foods which may be cooked in a residential oven, and the limited space in which to provide an identification of the foods (on the front of the oven) and to communicate to the control unit 250 which food product is to be cooked, a relatively small LED or computer-like screen may be employed with extensive use of drop-down screens or menus.

Thus an initial "Oven" window may provide—for example, on the display 202—the following oven options: Turbocook, Microwave, My Recipes, Defrost, Clean, Setup. The user then selects the desired Oven option—for example, by pressing pressure-sensitive screen 204. Purely by way of illustrative example, selection of the Turbocook option will cause a drop-down screen displaying the Turbocook procedures as follows: Bake, Roast, Broil, Toast, Oven Crisp. Selection of the Bake option will result in a drop-down screen display for "Bake What?" as follows: Casserole, Pizza, Baked Goods, Meats, Vegetables. (Selection of the "Roast" option of the Turbocook drop-down screen will result in the opening of a "Roast What?" drop-down screen specifying: Beef, Pork, Poultry, Vegetables; etc.) Selection of the Meats option would result in a drop-down screen for "What Type?" as follows: Beef, Pork, Poultry, Fish. A selection of any of these options would cause a "Bake Temperature" drop-down screen to appear which would offer a selection of temperatures at which to bake the food product. The user has the option of setting the pre-set temperature for Bake and Roast, but the oven is "pre-set" for Broil at 500° F., for Toast at 450° F. and for Oven Crisp at 450 degrees Fahrenheit.

Note that if the selected temperature is not within a predetermined range of the current oven temperature (for example, within 25 degrees Fahrenheit to 30 degrees Fahrenheit), the control unit will recognize that a "pre-heat" or "cool-down" period may be required before actual cooking of the food product commences. During the pre-heating or cool down stage the display will preferably instruct the user to wait to place the food product in the oven until the oven either warms up or cools down to the pre-set temperature. When the pre-set temperature has been reached, or almost reached, the control unit will then display the temperature and indicate that it is ready to have food placed in the cooking chamber.

Regardless of the selected "Turbocook" option, the control unit will require input from the user as to the total cooking time. The duration of stages in the cooking cycle (according to the generic cooking formulas) are calculated as percentages of the total cooking time set by the user. It will be noted that each cooking cycle (the amount of time necessary to cook a food product) is divided into at least one and potentially an infinite number of cook stages.

The use of staged inquiries through drop-down screens and menus in a computer is well-known and hence need not be set forth herein in further detail.

Among its many other features, the control unit 250 preheats the oven immediately upon the oven being turned on. The preheat period is about twelve minutes for a 110 volt system and about 6 minutes for a 240 volt system.

The available cook programs are grouped by profiles, each profile including a generic cooking formula suitable for a particular type of cooking of a particular food product. Each profile contains a number of stages or events in the cooking cycle which are run for a predetermined percentage of the total cook time. The percentage of maximum capacity for the blower assembly 40 and the magnetron 100 is given separately for each stage. Accordingly, the generic cooking formula utilized for each stage of a profile is dependent upon the user setting of time and, in the case of baking and roasting, upon the user setting of temperature as well.

It should be appreciated that the temperature at which the hot air cooks (browns) a food product in any given stage or event of the cooking cycle is not necessarily exactly the temperature set by the user. Each stage or event may be a temperature relative to the user-set temperature—for example, 20° F. higher or 30° F. lower.

Once the food product has been cooked according to the generic formula, the residential oven affords the user the option of specifying that the particular food product then in the oven should be further cooked (by microwaves alone), further browned (by hot air) or both cooked and browned (by further microwave and hot air cooking). For pedagogical purposes the cooking (heating) effect of the hot air used for browning will be ignored.

"Custom finishing" refers to the ability of the oven user to vary individually and independently the amount of hot air cooking (that is, the cooking which both heats and browns the food product) and the amount of microwave cooking (that is, the cooking which heats the food product without browning it). The custom finishing may be necessitated by variations in the size, shape or weight of the food product actually being cooked from the theoretical norm upon which the cook settings are based. On the other hand, the custom finishing may simply be required because of individual preferences—e.g., a given user's preference for heavily browned food products, for extremely hot food products, or even extremely hot and heavily browned food products.

A wide variety of different means may be employed to achieve the custom finishing. In the preferred embodiment, once the cooking according to the generic cook program profile has been completed, the user may be asked whether additional heating, additional browning, or both are desired. For example, an appropriate message may be displayed on the LED screen 202, with the user being able to select more browning or more heating, or both, simply by appropriate touches on a touch-sensitive screen 204. In a somewhat simplified version, there may be rotary knobs which the user can rotate to communicate the same information, or even pushbuttons with each actuation of a pushbutton being used to increase the amount of additional browning or the amount of additional heating.

The basis for the increase in browning time or cooking (heating) time is preferably in terms of the blower capacity or microwave capacity of the oven. Thus, more browning can be achieved by adding hot air in fixed increments of the blower capacity (e.g., 20%, 40%, 60%, 80%, etc.) for a predetermined time. Similarly, more heating can be achieved by adding increments of the microwave capacity (e.g., 33%, 50%, 100%, etc.) for a predetermined time. For particular applications, it may be desirable for the user to have the option of setting the temperature of the additional hot air to be used, if it is to be varied from the initial hot air temperature initially designated by the user. Also in particular applications, it may be desirable for the user to have the option of setting the time during which the additional hot air or microwave cooking will be performed. It will be appreciated that a modification of the hot air or heat energy being supplied requires consideration of both the time during which it is to be supplied and the percent capacity of the blower utilized to supply it, as well as the temperature at which it is to be supplied. Similarly, the modification of the microwave energy to be supplied requires consideration of the time during which it is to be supplied and the percentage of the magnetron capacity utilized to supply it. The ability of the oven to enable separate modification of the thermal energy and microwave energy enables a broad range of user preferences to be accommodated, as well as a wide variety in the size of the food product(s) to be cooked. The versatility of the oven according to the present invention is therefore not found in prior art commercial ovens which enable the cooking cycle—with its predetermined settings for thermal energy and microwave energy—to simply be extended for a given period of time (e.g., in either absolute terms or as or a percentage of the last cooking event), rather than enabling separate and independent control of the heating and browning functions as in the present invention.

The "custom finishing" operation described hereinabove refers to adjustments that are made by a user to an already cooked food product (i.e., one which has already undergone a completed cooking cycle as determined by the appropriate generic cook formula) but does not address the cooking of a food product which is to be cooked with less than the amount of heating and/or browning specified by the generic cook formula. To this end, the control unit 250 may be programmed to advise the user when the cooking cycle is partially complete (e.g. 75% of the way through the total cook time) and then provide the user with the option of determining by inspection the state of the food product in the oven (by pausing the cooking cycle) and adjusting independently for less browning through the remainder of the cooking cycle, less heating through the remainder of the cooking cycle, or both, through an interface system similar to that used in the "custom finishing" operation. Depending upon the particular application desired, the reduction can be in terms of a percentage reduction in the browning time or heating time remaining, or it can simply alter the percentage of blower capacity or microwave capacity utilized in the remaining stage(s). This adjustment of the cooking cycle or profile by the user is referred to as "custom cooking" as it is performed upon an only partially cooked food product.

It is desirable that the user have the opportunity to store the modified generic cooking profile resulting from the use of the generic cooking formula plus the "custom cooking" and "custom finishing" operations (or at least the "custom cooking" operation) so that it may be used again if the modified cooking profile produced a satisfactory product. To this end, the control unit can add an entry which contains the parameters for the modified cook to the "My Recipes" memory of the oven.

Figure 14A:
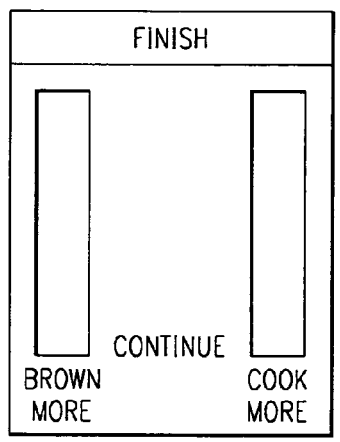
FIGS. 14A, 14B, 14C, 15A, 15B, and 15C depict exemplary displays for communicating to the user the option for custom finishing or custom cooking.
Figure 14B:
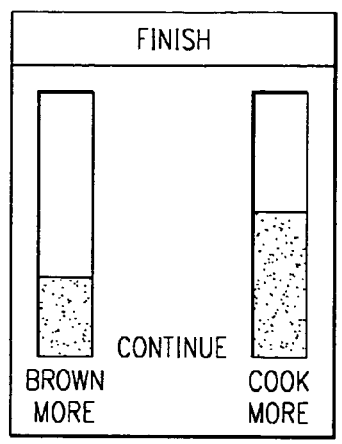
Figure 14C:
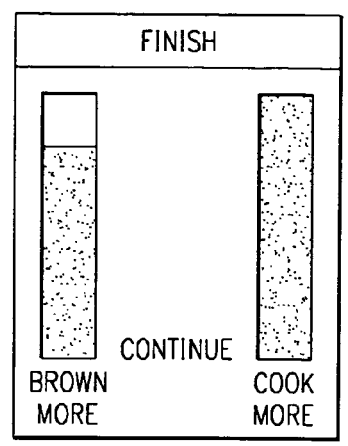
Figure 15A:
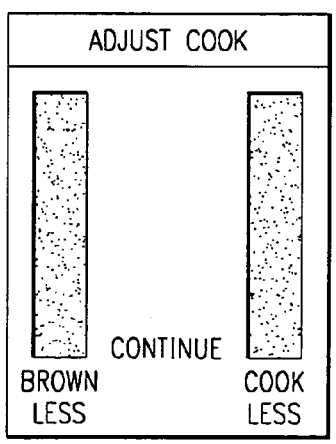

Referring now to FIGS. 14a and 15a, therein illustrated are specimen displays for communicating to the user the option for custom finishing and custom cooking, respectively. While the displays are illustrated as being vertical bar charts, clearly other configurations (such as cones) may be utilized. In the initial custom finishing display illustrated in FIG. 14a, both bars are initially set at 0%. FIGS. 14b and 14c represent different alternative selections which may be made by a user in order to provide custom finishing. FIG. 14c, in particular, shows that substantially more "finish off" is preferred and, in particular, that the cooking (heating) is to be maximized (at 100%) and the amount of additional browning desired is approximately 80%. If still further finish off is desired, once the additional cooking has been completed, the initial display of FIG. 14a may be provided once again to enable the user to select even further finish off by more hot air, more microwave, or both.

Figure 15B:
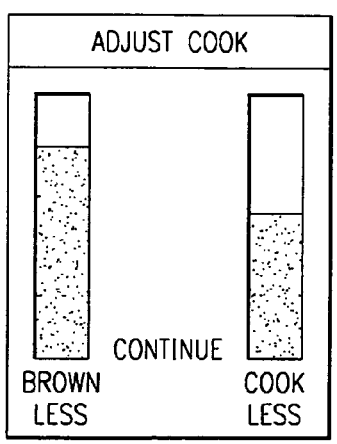
Figure 15C:
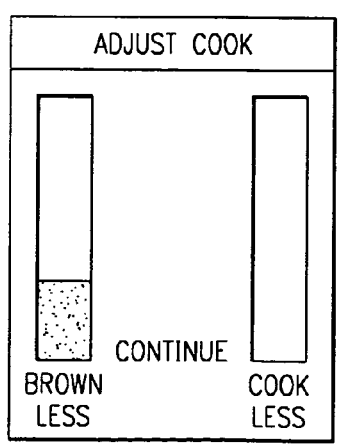

FIGS. 15b–15c illustrate possible user settings for custom cooking. As previously described, at approximately 75% of the way through the cooking cycle, the oven displays a message to the user to check the food product. At this point the user has the opportunity to cook less aggressively through the remainder of the cooking cycle, by reducing the amount of hot air, reducing the amount of microwave energy, or reducing both hot air and microwaves. In the initial custom cooking display illustrated in FIG. 15a both the hot air and microwave energy bars are pre-set at 100%. If, for example, the user desired less browning and less cooking through the remainder of the cooking cycle, the user might choose settings as represented in FIG. 15b. FIG. 15b depicts the settings wherein the user has adjusted the remaining cooking by reducing the hot air to energy approximately 80% and also reducing the amount of microwave energy to approximately 50%. By way of example, the user could have alternatively adjusted the cooking paradigm as depicted in FIG. 15c wherein the further amount of hot air has been reduced to approximately 20% and the further amount of microwave energy has been reduced to zero. FIG. 15c therefore depicts a scenario wherein no more cooking will occur by microwaves and only a little more browning will occur for the remainder of the already set cooking time.

As earlier noted, depending upon the programming of the control unit, the additional browning or cooking (heating), through the remainder of the cooking cycle, may be in terms of a fixed period of time, a percentage of the total cook time, a percentage of the cook time in the last stage of the generic cooking formula, the percentage of blower capacity or magnetron capacity, or the like.

While the cooking chamber 16 is illustrated as being box-like, and, more particularly a rectangular parallelepiped (i.e., having a rectangular cross-section), preferably the cooking chamber of cooking cavity has a configuration which is either cylindrical or conical. A box-like cavity creates non-uniform cavity heating as a result of the corners creating asymmetric heating conditions. Thus in a convection oven, the corners create zones within the cavity which may be characterized either as low airflow zone or excess airflow zones. In the low airflow zones the hot air tends to stagnate with the results that the food product within such a zone is undercooked, and in the excess zones, the airflow is higher than in the rest of the cavity and tends to overcook the food product within such a zone. Oven designs have been implemented in the prior art to create a more uniform time-averaged set of hot airflow conditions, e.g., designs using airflow baffles and the like. However, the changes affected by these means tend to be very food product specific and do not represent a solution for all cooking conditions. In a similar manner, in a microwave oven the microwave energy distribution is affected by the corner boundary conditions, thereby resulting in hot spots and cold spots within the cavity. Oven designs have been implemented in the prior art to eliminate the impact of cavity corners and their affect on the microwave energy distribution, e.g., designs using mode stirrers, rotating platters and the like. However, none of these design changes restores a uniform microwave energy field in a box-like cavity.

Accordingly, in a preferred embodiment of the present invention the oven has a cylindrical or conical cavity 16 which is in effect cornerless, thereby eliminating the corner boundary conditions that result in a non-uniform energy transfer (whether it be hot air or microwave energy). The cylindrical or conical cooking chamber produces a uniform cook which is relatively insensitive to the particular food product type being cooked.

While the conduit 20 has been described herein and above as a separate physical entity from the cooking chamber 16, those skilled in the oven art will recognize that, at various points within the oven, the cooking chamber 16 and the conduit means 20 may share a common wall, thereby to enable a more compact and less expensive oven. On the other hand, where the temperature difference between the airflow in the conduit means 20 and the airflow in the cooking chamber 16 is so extreme that the cooking of the food product in the cooking chamber would be adversely affected thereby, the adjacent wall portions of the cooking chamber and the conduit may be spaced apart, with thermal insulation optionally being placed in the space thus formed.

While the herein described embodiment of the present invention utilizing an electric thermal energy source is preferred, alternatively the energy source for the convective heat transfer mode could be natural gas, propane or a like combustible material. From an overall operating energy cost stand point, the natural gas or similar gas fuel is the preferred energy source. In addition, for those residential installation where electric service to the kitchen is inadequate for powering all aspects of the oven (that is, both the microwave and convector thermal heating), a natural gas or propane fueled heating system may be an option.

Clearly the natural gas fired convective heating subsystem must be capable of providing rapid heating while also being suitable for a microwave environment. Preferably the natural gas fired convective heating subsystem further minimizes or eliminates contacts of the products of combustion (of the natural gas) with food products. For example, when the products of natural gas combustion contact certain meats, a surface pinkness or pink discoloration may be observed in the cooked meat and may be misinterpreted by consumers as an offensive level of undercooking. It is believed that the products of combustion (i.e., carbon monoxide and nitric oxide) react with the myoglobin in the meat to create the pink surface condition.

Accordingly, an indirect fired convective system, wherein the combustion products do not contact the food product, is preferred for its high speed and high quality cooking, over a direct fired system, wherein the combustion products transfer their heat directly to the food product. In the indirect fired conductive system, heat from the combustion products is transferred via heat exchanger elements to the oven airflow, thereby isolating the products of combustion from the cooking cavity and eliminating several issues associated with the direct fired conductive system (including the need to substantially increase the vent size of the oven cavity to accommodate the flow of the combustion products therethrough and to avoid incompatibility with a microwave environment). The indirect fired conductive system preferably is compact, has a short ignition cycle (e.g., about three seconds), and utilizes a lightweight heat exchanger for quick response in a high speed oven. To accomplish these goals, a fully premixed powered combustion system, including a thin walled stainless steel heat exchanger, is preferred.

In order to provide a more compact oven suitable for residential use, the commercial oven described in the TurboChef Patents has been modified as follows:

1. A separate and distinct plenum/reservoir containing a high mass heat exchanger has been eliminated so that the conduit means now serve the function of the plenum, and the heat or thermal energy reservoir within the plenum has been replaced by an electric heating element located within the conduit means for directly heating the air passing thereby "on the fly";
2. The platter having a large central aperture through which air passes out of the cooking chamber has been replaced by a platter having a substantially uniform pattern of smaller apertures which achieve substantially the same "shroud" effect for economical and rapid cooking of the food product; and
3. To enable a better fit of the blower, magnetron and catalytic converter within the available space, the blower motor may be separated from the blower wheel and connected thereto by a flexible drive belt, the magnetron may be rotated and connected to a shorter, vertical circular launcher by a two-part waveguide system, and additional catalytic converter material may be coated on the interior of the conduit walls rather than being present exclusively in a catalytic converter.

To summarize, the present invention provides an oven for quick cooking of a food product, wherein the oven is suitable for residential use. In a preferred embodiment, the oven is sufficiently compact for residential use and includes user-operable custom cooking means and/or user-operable custom finishing means. The oven is easy and inexpensive to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. For use in a cooking device capable of accessing a communications system, a high speed oven for combining hot air impingement cooking and microwave cooking, said high speed oven comprising:
    a cooking chamber;
    a programmable controller for executing program instructions;
    memory media for recording executable program instructions;
    at least one controllable cooking system under control of said programmable controller, providing a data-processing-controlled high speed cooking process for food placed in said cooking chamber;
    a plurality of cooking programs recorded in said memory media of said high speed oven, each of said plurality of cooking programs divided into a predetermined duration of states in a cooking cycle which are capable of running for a predetermined percentage of a total cook time, wherein each of said plurality of cooking programs define for defining a plurality of high speed cooking routines for alternating hot air impingement cooking and microwave cooking at fixed increments of capacity for a predetermined time;
    a gateway server communicatively coupled to a plurality of household systems and further communicatively coupled to said programmable controller for managing the communication of digital data content which is at least in-part related to operation and utilization of said high speed oven; and
    a broadband communication channel extending from a source of digital data content, which is external to a residence, for delivering particular digital data content to said high speed oven through said gateway server for distribution within said residence including distribution to said programmable controller of said high speed oven in order to facilitate cooking operations utilizing said high speed oven.

2. The high speed oven according to claim 1, wherein said gateway server comprises a data processing device housed in a location external to said high speed oven.

3. The high speed oven according to claim 1, wherein said gateway server comprises at least one data processing device from the following data processing devices:
    a home personal computing system;
    a set top cable box;
    an internet appliance;
    a combination television and internet appliance;
    a home automation system;
    a satellite communication system;
    a residential broadband bidirectional communication system.

4. The high speed oven according to claim 1, wherein said gateway server and said programmable controller of said high speed oven communicate through an input/output system which allows at least one of the following types of communication;
    serial communication of data;
    parallel communication of data;
    communication of control signals;
    communication of digital data content.

5. The high speed oven according to claim 1, wherein said programmable controller of said high speed oven is communicatively coupled through said gateway server to at least one of the following devices:

a home personal computing system;
a home television system;
a home video display system;
a code reading device; and
a wireless and portable internet appliance.

6. The high speed oven according to claim 1, wherein said programmable controller of said high speed oven operates collaboratively with said gateway server to define a broadband communication system which allows a bi-directional communication of digital data content between a residence and resources external of said residence.

7. The high speed oven according to claim 6, wherein broadband communication system allows communication speeds as low as a slow modem connection and as high as the highest commercially possible data rates.

8. For use in a cooking device capable of accessing a communications system, a high speed oven for combining hot air impingement cooking and microwave cooking, said high speed oven comprising:
- a cooking chamber;
- a programmable controller for executing program instructions;
- memory media for recording executable program instructions;
- a plurality of cooking energy sources, which are different from one another, which are under control of said programmable controller, and which together provide a data-processing-controlled high speed combination cooking process for food placed in said cooking chamber;
- a plurality of cooking programs recorded in said memory media of said high speed oven, each of said plurality of cooking programs divided into a predetermined duration of states in a cooking cycle which are capable of running for a predetermined percentage of a total cook time, wherein each of said plurality of cooking programs define a plurality of high speed cooking routines for alternating hot air impingement cooking and microwave cooking at fixed increments of capacity for a predetermined time;
- a gateway server communicatively coupled to a plurality of household systems and further communicatively coupled to said programmable controller for managing the communication of digital data content which is at least in-part related to operation and utilization of said high speed oven; and
- a broadband communication channel extending from a source of digital data content, which is external to a residence, for delivering particular digital data content to said high speed oven through said gateway server for distribution within said residence including distribution to said programmable controller of said high speed oven in order to facilitate cooking operations utilizing said high speed oven.

9. The high speed oven according to claim 8, wherein said gateway server comprises a data processing device housed in a location external to said high speed oven.

10. The high speed oven according to claim 8, wherein said gateway server comprises at least one data processing device from the following data processing devices:
- a home personal computing system;
- a set top cable box;
- an internet appliance;
- a combination television and internet appliance;
- a home automation system;
- a satellite communication system;
- a residential broadband bi-directional communication system.

11. The high speed oven according to claim 8, wherein said gateway server and said programmable controller of said high speed oven communicate through an input/output system which allows at least one of the following types of communication;
- serial communication of data;
- parallel communication of data;
- communication of control signals;
- communication of digital data content.

12. The high speed oven according to claim 8, wherein said programmable controller of said high speed oven is communicatively coupled through said gateway server to at least one of the following devices:
- a home personal computing system;
- a home television system;
- a home video display system; and
- a code reading device.

13. The high speed oven according to claim 8, wherein said programmable controller of said high speed oven operates collaboratively with said gateway server to define a broadband communication system which allows a bidirectional communication of digital data content between a residence and resources external of said residence.

14. The high speed oven according to claim 13, wherein said broadband communication system allows communication speeds as low as a slow modem connection and as high as the highest commercially possible data rates.

* * * * *